(12) United States Patent
Kim et al.

(10) Patent No.: US 8,861,447 B2
(45) Date of Patent: *Oct. 14, 2014

(54) GROUP IDENTIFICATION AND DEFINITION EMPLOYING LOOK UP TABLE (LUT) WITHIN MULTIPLE USER, MULTIPLE ACCESS, AND/OR MIMO WIRELESS COMMUNICATIONS

(75) Inventors: Joonsuk Kim, Saratoga, CA (US); Eric J. Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 942 days.

This patent is subject to a terminal disclaimer.

(21) Appl. No.: 12/949,921

(22) Filed: Nov. 19, 2010

(65) Prior Publication Data

US 2011/0064040 A1 Mar. 17, 2011

Related U.S. Application Data

(63) Continuation-in-part of application No. 12/796,655, filed on Jun. 8, 2010, which is a continuation-in-part of (Continued)

(51) Int. Cl.
*H04W 4/00* (2009.01)
*H04W 72/12* (2009.01)
*H04L 1/06* (2006.01)
*H04B 7/06* (2006.01)

(52) U.S. Cl.
CPC .......... *H04W 72/121* (2013.01); *H04B 7/0669* (2013.01); *H04L 1/0631* (2013.01); *H04B 7/0697* (2013.01)
USPC .......... 370/329; 370/432; 370/473; 370/349; 370/252; 370/394

(58) Field of Classification Search
None
See application file for complete search history.

(56) References Cited

U.S. PATENT DOCUMENTS 6,973,500 B1 * 12/2005 Yamamoto et al. .......... 709/229
7,062,703 B1 6/2006 Keaney
(Continued)

OTHER PUBLICATIONS

European Search Report for EP Application No./Patent No. 11001048.5-2411, dated Jun. 1, 2011, 7 pages.

*Primary Examiner* — Kibrom T Hailu
(74) *Attorney, Agent, or Firm* — Garlick & Markison; Shayne X. Short

(57) ABSTRACT

Group identification and definition employing look up table (LUT) within multiple user, multiple access, and/or MIMO wireless communications. A LUT provides a very concise representation of the relationship between group IDs and various subsets of wireless communication devices. Each respective group ID can correspond to more than one subset of wireless communication devices, and each when included within corresponding subsets, a given wireless communication device occupies a common, respective location (e.g., first location, second location, etc.) within each of those corresponding subsets. When a received multi-user packet (e.g., OFDMA, MU-MIMO, or combination thereof) is received by and ascertained to be intended for a wireless communication device, then it may be further determined which space time streams of the multi-user packet correspond to that wireless communication device, as determined based on to the location of the wireless communication device within the corresponding subset associated with that particular group ID.

23 Claims, 31 Drawing Sheets

Related U.S. Application Data application No. 12/794,707, filed on Jun. 4, 2010, and a continuation-in-part of application No. 12/794,711, filed on Jun. 4, 2010, now Pat. No. 8,498,359.

(60) Provisional application No. 61/321,430, filed on Apr. 6, 2010, provisional application No. 61/319,366, filed on Mar. 31, 2010, provisional application No. 61/185,153, filed on Jun. 8, 2009, provisional application No. 61/185,161, filed on Jun. 8, 2009, provisional application No. 61/186,119, filed on Jun. 11, 2009, provisional application No. 61/311,480, filed on Mar. 8, 2010, provisional application No. 61/250,491, filed on Oct. 9, 2009, provisional application No. 61/255,690, filed on Oct. 28, 2009, provisional application No. 61/257,323, filed on Nov. 2, 2009, provisional application No. 61/232,316, filed on Aug. 7, 2009, provisional application No. 61/240,285, filed on Sep. 7, 2009, provisional application No. 61/250,531, filed on Oct. 11, 2009, provisional application No. 61/255,232, filed on Oct. 27, 2009, provisional application No. 61/184,420, filed on Jun. 5, 2009.

(56) References Cited

U.S. PATENT DOCUMENTS

| | | | |
|---|---|---|---|
| 7,257,095 B2 | 8/2007 | Liu | |
| 8,089,982 B1 * | 1/2012 | Vleugels et al. | 370/447 |
| 2003/0083086 A1 * | 5/2003 | Toyryla et al. | 455/518 |
| 2003/0177267 A1 | 9/2003 | Orava | |
| 2005/0025080 A1 | 2/2005 | Liu | |
| 2008/0181156 A1 | 7/2008 | Ecclesine | |
| 2008/0186890 A1 | 8/2008 | Shao | |
| 2008/0192622 A1 * | 8/2008 | Scheim et al. | 370/210 |
| 2008/0229112 A1 * | 9/2008 | Yamauchi et al. | 713/183 |
| 2008/0232490 A1 | 9/2008 | Gross | |
| 2011/0149760 A1 * | 6/2011 | Shrivastava et al. | 370/252 |
| 2011/0158159 A1 * | 6/2011 | Gong et al. | 370/328 |

* cited by examiner

| field | valid values | # bits |
|---|---|---|
| # AIDs that follow (k) | 1-16* | 4* |
| starting group ID (i) | 0-15 | 4 |
| # group IDS in this block (j) | 1-15 | 4 |
| AID #1 | | 48 |
| order for group ID i | 0-3 | 2 |
| order for group ID i+1 | 0-3 | 2 |
| ... | ... | |
| order for group ID i+j−1 | 0-3 | 2 |
| AID #2 | | 48 |
| order for group ID i | 0-3 | 2 |
| order for group ID i+1 | 0-3 | 2 |
| ... | ... | |
| order for group ID i+j−1 | 0-3 | 2 |
| AID #k | | 48 |
| order for group ID i | 0-3 | 2 |
| order for group ID i+1 | 0-3 | 2 |
| ... | ... | |
| order for group ID i+j−1 | 0-3 | 2 | alternative frame format

FIG. 18

| group ID | User # | | | | | | | |
|---|---|---|---|---|---|---|---|---|
| | 1 | 2 | 3 | 4 | 5 | 6 | 7 | |
| 1 | 0 | 0 | 1 | 2 | 3 | 1 | 0 | |
| 2 | 0 | 1 | 0 | 2 | 2 | 3 | 3 | |
| 3 | 0 | 1 | 2 | 0 | 1 | 3 | 2 | |
| 4 | 0 | 1 | 2 | 0 | 2 | 0 | 3 | |
| 5 | 0 | 1 | 2 | 1 | 2 | 3 | 1 | |
| 6 | 0 | 1 | 2 | 3 | 2 | 2 | 1 | |
| 7 | 0 | 1 | 2 | 3 | 3 | 0 | 1 | | table values indicate the order (0-3)

FIG. 19 group ID and user table

- table values indicate the order (0-3)
- 3528 bits total

| ID 1 | user #1 | user #3 | user #4 | user #5 |  |  |
|---|---|---|---|---|---|---|
| ID 1 | user #2 | user #6 | BOGUS | BOGUS |  |  |
| ID 1 | user #7 | BOGUS | BOGUS |  |  |  |
| ID 2 | user #1 | user #2 | user #4 | user #6 |  |  |
| ID 2 | user #3 | BOGUS | BOGUS | user #7 |  |  |
| ID 3 | user #1 | user #2 | user #3 | user #6 |  |  |
| ID 3 | user #4 | user #5 | user #7 | BOGUS |  |  |
| ID 4 | user #1 | user #2 | user #3 | user #7 |  |  |
| ID 4 | user #4 | BOGUS | user #5 | BOGUS |  |  |
| ID 4 | user #6 | user #7 | BOGUS |  |  |  |
| ID 5 | user #1 | user #2 | user #3 | user #6 |  |  |
| ID 5 | BOGUS | user #4 | user #5 | BOGUS |  |  |
| ID 5 | BOGUS | user #7 | BOGUS |  |  |  |
| ID 6 | user #1 | user #2 | user #3 | user #4 |  |  |
| ID 6 | BOGUS | user #7 | user #5 | BOGUS |  |  |
| ID 6 | BOGUS | BOGUS | BOGUS |  |  |  |
| ID 7 | user #1 | user #2 | user #3 | user #4 |  |  |
| ID 7 | user #6 | user #7 | BOGUS | user #5 |  |  |
| 4 bits each | 48 bits each | 48 bits each | 48 bits each | 48 bits each |

FIG. 20

| 7 | 1 | 7 |
|---|---|---|
| user #1 | 0 | 0 | 0 | 0 | 0 | 0 | 0 | 12 bits
| user #2 | 0 | 1 | 1 | 1 | 1 | 1 | 1 | 62 bits
| user #3 | 1 | 0 | 2 | 2 | 2 | 2 | 2 | 62 bits
| user #4 | 2 | 2 | 0 | 0 | 1 | 2 | 3 | 62 bits
| user #5 | 3 | 2 | 1 | 2 | 2 | 3 | 3 | 62 bits
| user #6 | 1 | 3 | 3 | 0 | 3 | 2 | 0 | 62 bits
| user #7 | 0 | 3 | 2 | 3 | 1 | 1 | 1 | 62 bits 48 bits each | 2 bits | 2 bits | 2 bits | 2 bits | 2 bits | 2 bits | 2 bits

- "user #" is a 48 bit MAC address
- 446 bits total (vs. 3528 bits)

FIG. 21

| group ID | STA # | | | | | | M= |
|---|---|---|---|---|---|---|---|
| | 1234 | 1234 | 1234 | 1234 | 1234 | 1234 | |
| 1 | ABCD | EFGH | AFCD | EBGH | EFCH | ABCH | EFGD | 8 |
| 2 | ABCE | DFGH | ABGE | DFCH | ABGD | AFCE | DBGH | 6 |
| 3 | ABCF | DEGH | AECH | DBGF | AFCE | DBGF | | 6 |
| 4 | ABEF | CDGH | ABGF | AECH | DBGF | AEGH | | 6 |
| 5 | ABCG | DEFH | ABFH | ADEG | CDEH | ABEH | | 6 |
| 6 | ABDE | CFGH | ABDH | ADEH | DECG | AEFG | CBDE | 8 |
| 7 | ACEG | BDFH | ADEG | CFGE | AFGH | CBDE | | 6 |
| 8 | ABDF | CEGH | AEDH | BCFH | ACFG | BDEH | | 6 |
| 9 | ACDE | BFGH | ACDH | CBGF | ABGH | CEDF | | 6 |
| 10 | ACDG | BEFH | AEFH | BFGE | ACGH | BFDE | | 6 |
| 11 | ADGH | BCEF | ADGF | BCDG | ACFH | BEDG | | 6 |
| | | | | BCEH | ADEF | BCGH | | 6 | total = 70 group ID LUT

FIG. 23

- all 70 combinations grouped with 11 group IDs
- group ID # 0 == broadcasting packet

| group ID | STA # | | | | | M= |
|---|---|---|---|---|---|---|
| | 1234 | 1234 | 1234 | 1234 | 1234 | |
| 1 | AFCD | EBGH | ABGD | EFCH | ABCH | EFGD | | | 6 |
| 2 | EBCE | DFGH | ABGE | DFCH | AFCE | DBGH | | | 6 |
| 3 | ABCF | DEGH | AECH | DBGF | AEGH | DBCF | | | 6 |
| 4 | ABEF | CDGH | ABGF | CDEH | ABEH | CDGF | | | 6 |
| 5 | ABCG | DEFH | ABFH | DECG | AEFG | DBCH | | | 6 |
| 6 | ABDE | CFGH | ABDH | CFGE | AFGH | CBDE | AFDH | CBGE | 8 |
| 7 | ACEG | BDFH | ADEG | BCFH | ACFG | BDEH | | | 6 |
| 8 | ABDF | CEGH | AEDH | CBGF | ABGH | CEDF | | | 6 |
| 9 | ACDE | BFGH | ACDH | BFGE | ACGH | BFDE | | | 6 |
| 10 | ACDG | BEFH | AEFH | BCDG | ACFH | BEDG | | | 6 |
| 11 | ADGH | BCEF | ADGF | BCEH | ADEF | BCGH | | | 6 |
| 12, 13 | | | RESERVED | | | | |
| 14 | ABCD | | | | | | 1 |
| 15 | EFGH | | | | | | 1 | total =70 group ID LUT

FIG. 24

- all 70 combinations grouped with 11 group IDS
- group ID # 0 == broadcasting packet group ID LUT

| group ID | STA # | | | | | | | M= | STAs that share the STA # position |
|---|---|---|---|---|---|---|---|---|---|
| | 1234 | 1234 | 1234 | 1234 | 1234 | 1234 | 1234 | | |
| 1 | AFCD | EBGH | ABGD | EFCH | ABCH | EFGD | | 1234 | 6 | AE, BF, CG, DH |
| 2 | ABCE | FGHD | AGHE | FBCD | ABHD | FGCE | | | 6 | AF, BG, CH, DE |
| 3 | ABCF | GHDE | AHCE | GBDF | AHDE | | | | 8 | AG, BH, EF |
| 4 | ABEF | CDGH | ABGF | CDEH | ABEH | CDGF | AHDF | | 6 | AC, EG, FH, BD |
| 5 | ABCG | DEFH | ABFH | DECG | AEFG | DBCH | | | 6 | AD, BE, CF, DG |
| 6 | ABDE | HCGF | ABGE | HCDF | | | | | 4 | AH, BC |
| 7 | ACEG | BDFH | ADEG | BCFH | ACFG | BDEH | | | 6 | CD |
| 8 | ABDF | CEHG | ABHG | CEDF | | | | | 4 | FG |
| 9 | ACDE | BFGH | ACDH | BFGE | ACGH | BFDE | AFGH | | 8 | AB, EH |
| 10 | ACDG | BEFH | AEFH | BCDG | ACFH | BEDG | | | 6 | CE, DF, GH |
| 11 | ADGH | BCEF | ADGF | BCEH | ADEF | BCGH | ACEF | BDGH | 8 | |
| 12, 13 | | | RESERVED | | | | | | | |
| 14 | ABCD | | | | | | | | 1 | |
| 15 | EFGH | | | | | | | | 1 | |

- all 70 combinations grouped with 11 group IDS
- group ID # 0 == broadcasting packet total = 70

- all 28 ($_8C_2$) pairs exist to share STA # position

FIG. 25

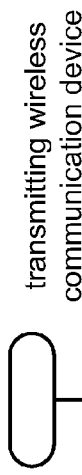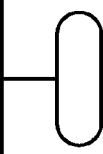

FIG. 30

3000 transmitting wireless communication device transmitting a group definition field (and/or a LUT) to a plurality of wireless communication devices 3010 transmitting a multi-user packet, that includes a group ID, to the plurality of wireless communication devices 3020 based on group definition field (and/or a LUT)

group ID (of multi-user packet) indicating a plurality of subsets of wireless communication devices (e.g., subset 1, subset 2, etc.) 3020a group ID (of multi-user packet) indicating respective field(s) of multi-user packet corresponding to wireless communication devices (e.g., first field for first wireless communication device, second field for second wireless communication device, etc.) 3020b group ID (of multi-user packet) indicating first space time stream corresponding to first wireless communication device, second space time stream corresponding to first wireless communication device, etc. 3020c

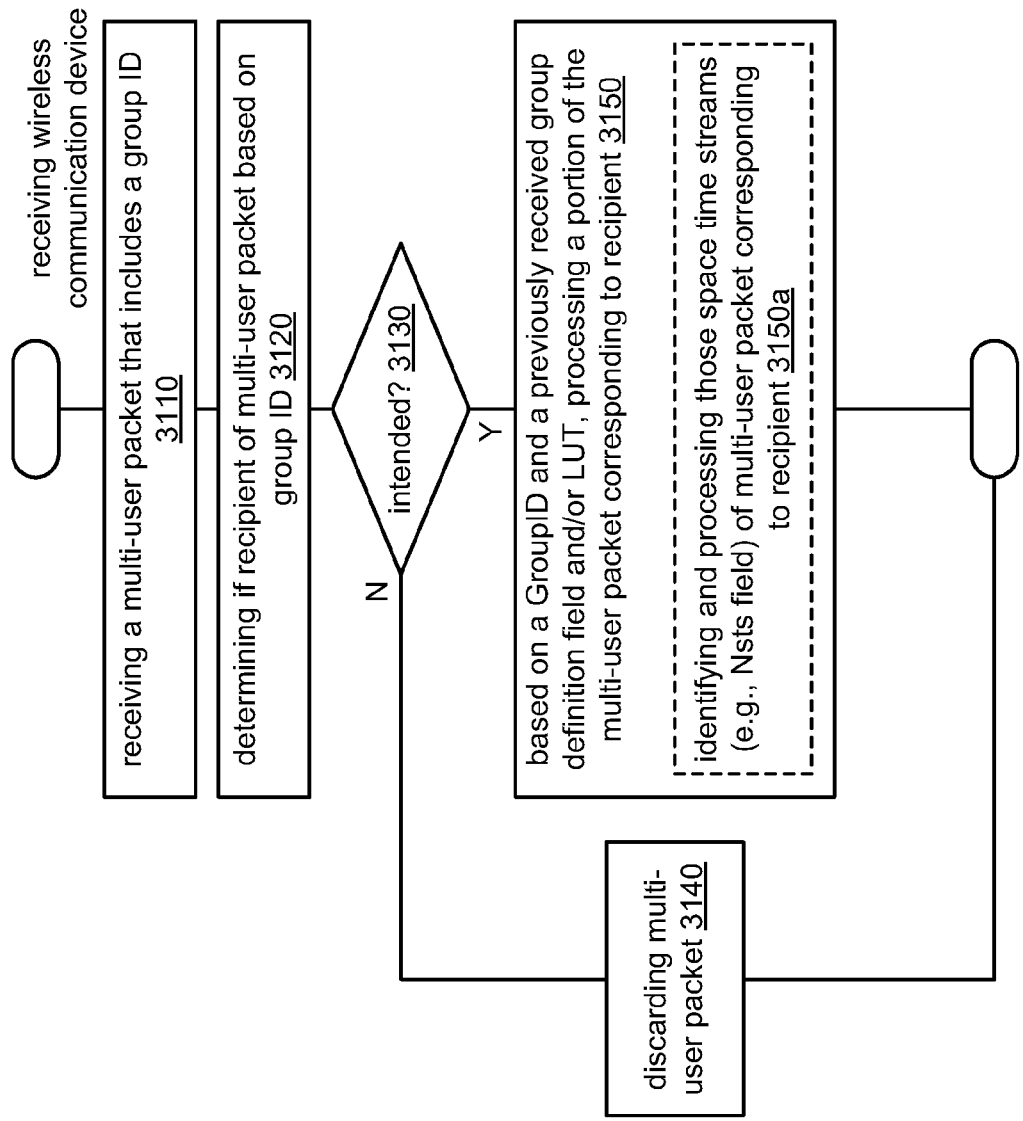

GROUP IDENTIFICATION AND DEFINITION EMPLOYING LOOK UP TABLE (LUT) WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:

1. U.S. Provisional Patent Application Ser. No. 61/321,430, entitled "Multi-user multiple input multiple output preamble," filed Apr. 6, 2010.

2. U.S. Provisional Patent Application Ser. No. 61/319,366, entitled "Efficient group ID for MU-MIMO transmissions in next generation WLAN," filed Mar. 31, 2010.

Continuation-in-Part (CIP) Priority Claims, 35 U.S.C. §120

The present U.S. Utility patent application claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

1. U.S. Utility patent application Ser. No. 12/796,655, entitled "Group identification and definition within multiple user, multiple access, and/or MIMO wireless communications," filed on Jun. 8, 2010, pending, which claims priority pursuant to 35 U.S.C. §119(e) to the following U.S. Provisional patent applications which are hereby incorporated herein by reference in their entirety and made part of the present U.S. Utility patent application for all purposes:

1.1. U.S. Provisional Patent Application Ser. No. 61/185,153, entitled "OFDMA cluster parsing and acknowledgement to OFDMA/MU-MIMO transmissions in WLAN device," filed Jun. 8, 2009.

1.2. U.S. Provisional Patent Application Ser. No. 61/185,161, entitled "WLAN Multi-user/OFDM multiple access training," filed Jun. 8, 2009.

1.3. U.S. Provisional Patent Application Ser. No. 61/186,119, entitled "WLAN Multi-user/OFDM multiple access training," filed Jun. 11, 2009.

1.4. U.S. Provisional Patent Application Ser. No. 61/311,480, entitled "Next generation WLAN backwards compatible sounding frame," filed Mar. 8, 2010.

1.5. U.S. Provisional Patent Application Ser. No. 61/250,491, entitled "Multi-user multiple input multiple output preamble," filed Oct. 9, 2009.

1.6. U.S. Provisional Patent Application Ser. No. 61/255,690, entitled "Multi-user multiple input multiple output preamble," filed Oct. 28, 2009.

1.7. U.S. Provisional Patent Application Ser. No. 61/257,323, entitled "Multi-user multiple input multiple output preamble," filed Nov. 2, 2009.

1.8. U.S. Provisional Patent Application Ser. No. 61/321,430, entitled "Multi-user multiple input multiple output preamble," filed Apr. 6, 2010.

1.9. U.S. Provisional Patent Application Ser. No. 61/232,316, entitled "WLAN next generation PHY header options," filed Aug. 7, 2009.

1.10. U.S. Provisional Patent Application Ser. No. 61/240,285, entitled "WLAN next generation PHY header options," filed Sep. 7, 2009.

1.11. U.S. Provisional Patent Application Ser. No. 61/250,531, entitled "WLAN next generation PHY header options," filed Oct. 11, 2009.

1.12. U.S. Provisional Patent Application Ser. No. 61/255,232, entitled "WLAN next generation PHY header options," filed Oct. 27, 2009.

1.13. U.S. Provisional Patent Application Ser. No. 61/319,366, entitled "Efficient group ID for MU-MIMO transmissions in next generation WLAN," filed Mar. 31, 2010.

The U.S. Utility patent application Ser. No. 12/796,655, entitled "Group identification and definition within multiple user, multiple access, and/or MIMO wireless communications," filed on Jun. 8, 2010, pending, also claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

2. U.S. Utility patent application Ser. No. 12/794,707, entitled "Cluster parsing for signaling within multiple user, multiple access, and/or MIMO wireless communications," filed on Jun. 4, 2010, pending, which claims priority pursuant to 35 U.S.C. §119(e) to the following U.S. Provisional patent applications which are hereby incorporated herein by reference in their entirety and made part of the present U.S. Utility patent application for all purposes:

2.1. U.S. Provisional Patent Application Ser. No. 61/184,420, entitled "OFDMA cluster parsing and acknowledgement to OFDMA/MU-MIMO transmissions in WLAN device," filed Jun. 5, 2009.

2.2. U.S. Provisional Patent Application Ser. No. 61/185,153, entitled "OFDMA cluster parsing and acknowledgement to OFDMA/MU-MIMO transmissions in WLAN device," filed Jun. 8, 2009.

The U.S. Utility patent application Ser. No. 12/796,655, entitled "Group identification and definition within multiple user, multiple access, and/or MIMO wireless communications," filed on Jun. 8, 2010, pending, also claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

3. U.S. Utility patent application Ser. No. 12/794,711, entitled "Transmission acknowledgement within multiple user, multiple access, and/or MIMO wireless communications," filed on Jun. 4, 2010, pending, which claims priority pursuant to 35 U.S.C. §119(e) to the following U.S. Provisional patent applications which are hereby incorporated herein by reference in their entirety and made part of the present U.S. Utility patent application for all purposes:

3.1. U.S. Provisional Patent Application Ser. No. 61/184,420, entitled "OFDMA cluster parsing and acknowledgement to OFDMA/MU-MIMO transmissions in WLAN device," filed Jun. 5, 2009.

3.2. U.S. Provisional Patent Application Ser. No. 61/185,153, entitled "OFDMA cluster parsing and acknowledgement to OFDMA/MU-MIMO transmissions in WLAN device," filed Jun. 8, 2009.

INCORPORATION BY REFERENCE

The following U.S. Utility patent applications are hereby incorporated herein by reference in their entirety and are made part of the present U.S. Utility patent application for all purposes:

1. U.S. Utility patent application Ser. No. 12/796,654, entitled "Channel characterization and training within multiple user, multiple access, and/or MIMO wireless communications," filed on Jun. 8, 2010, pending.

2. U.S. Utility patent application Ser. No. 12/852,435, entitled "Management frame map directed operational parameters within multiple user, multiple access, and/or MIMO wireless communications," filed on Aug. 6, 2010.

INCORPORATION BY REFERENCE

The following IEEE standards are hereby incorporated herein by reference in their entirety and are made part of the present U.S. Utility patent application for all purposes:

1. IEEE Std 802.11™-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 pages.

BACKGROUND OF THE INVENTION

1. Technical Field of the Invention

The invention relates generally to communication systems; and, more particularly, it relates to group identification and definition within shared communication media of multiple user, multiple access, and/or MIMO wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 18 is a diagram illustrating an embodiment of an alternative frame format that can be transmitted as a management frame, in either unicast or broadcast format, by AP.

FIG. 19 is a diagram illustrating an embodiment of group ID and user table, which is fixed in the communication protocol, specification, and/or recommended practices, rather than managed/updated via a wireless transmission (e.g., over the air) by one of the wireless communication devices (e.g., AP).

FIG. 20 is a diagram illustrating an embodiment of the group ID and user table of FIG. 19 in an alternative format.

FIG. 21 is a diagram illustrating an embodiment of the group ID and user table of FIG. 19 and FIG. 20 in yet an alternative format.

FIG. 23 is a diagram illustrating an embodiment of a group ID look up table (LUT).

FIG. 24 is a diagram illustrating an alternative embodiment of a group ID LUT.

FIG. 25 is a diagram illustrating yet an alternative embodiment of a group ID LUT.

FIG. 30 and FIG. 31 illustrate embodiments of methods for operating wireless communication devices.

DETAILED DESCRIPTION OF THE INVENTION

Figure 1:
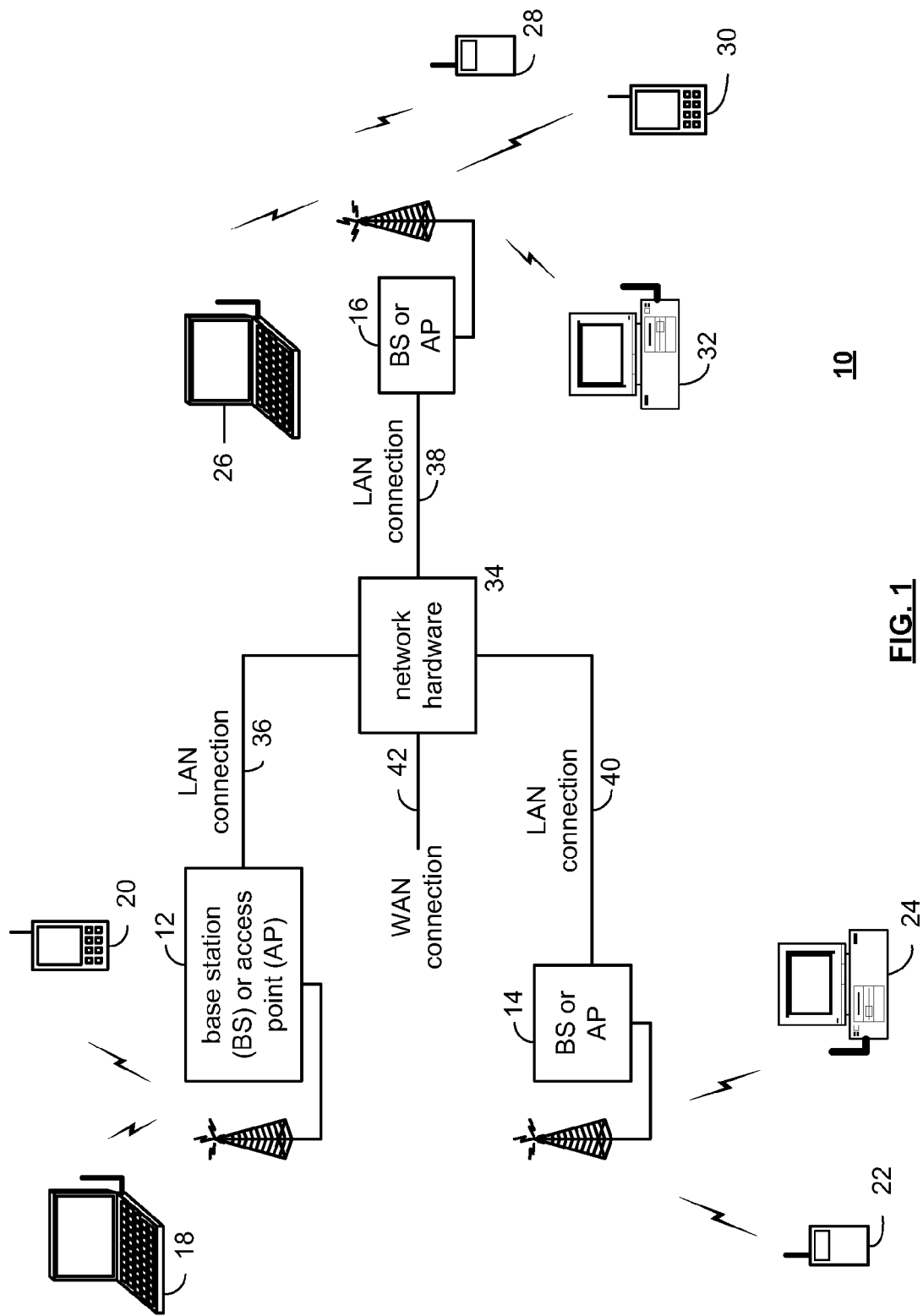
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
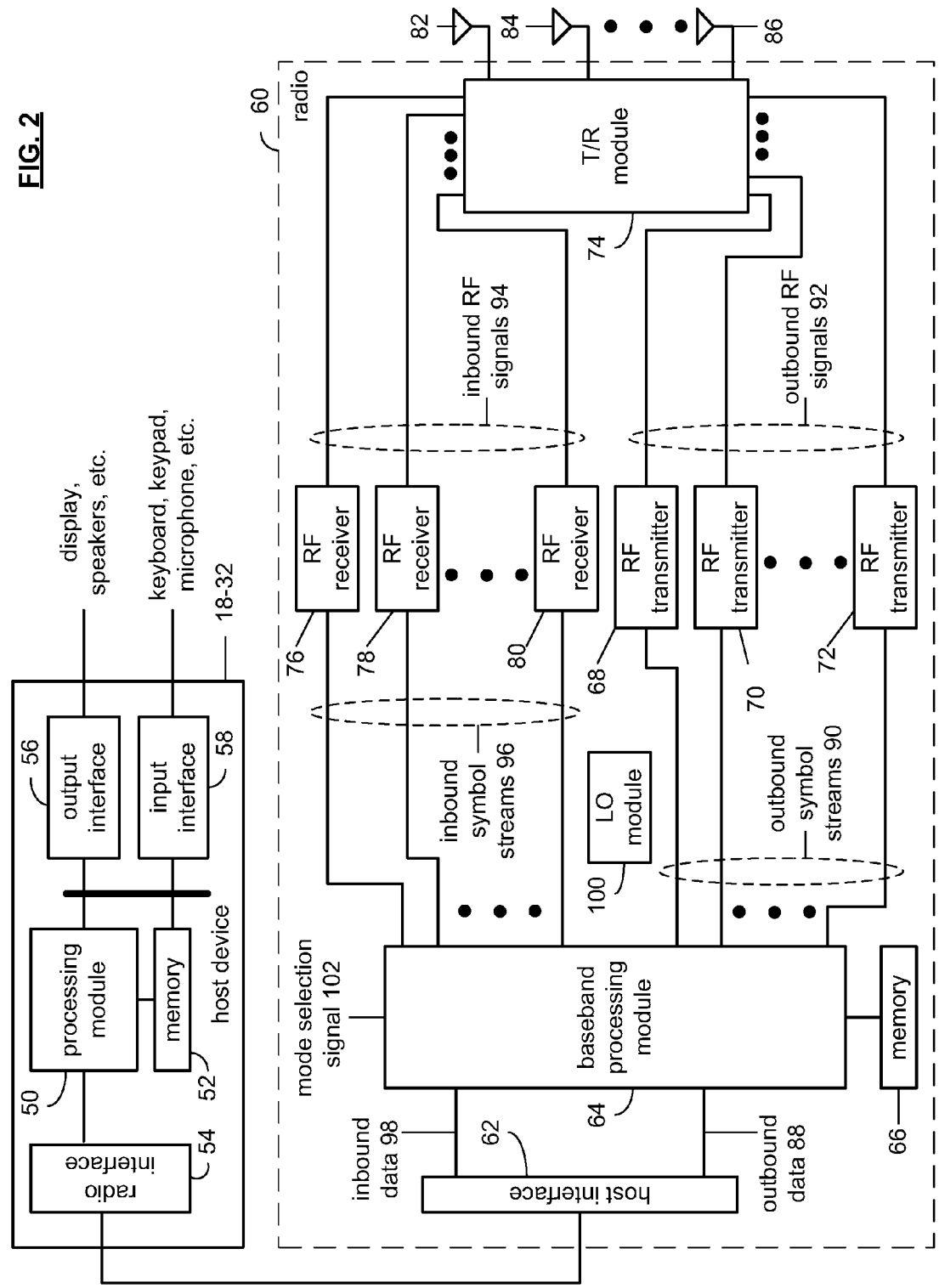
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams. The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
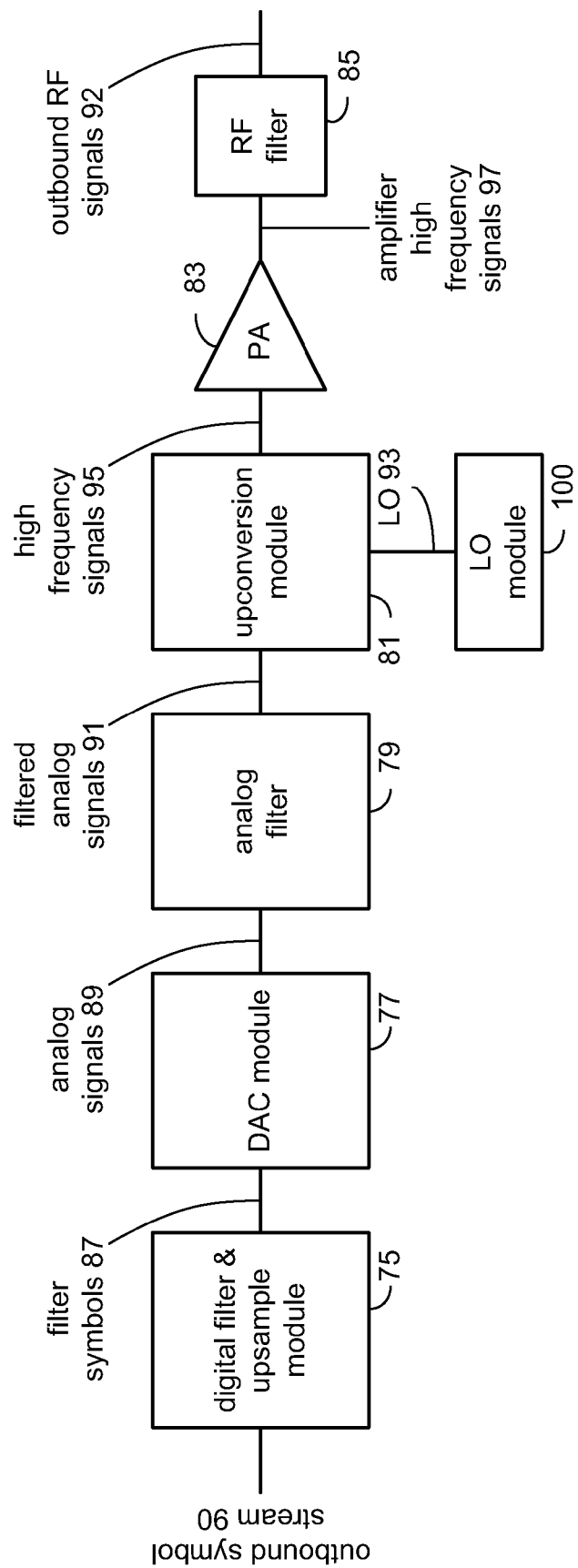
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
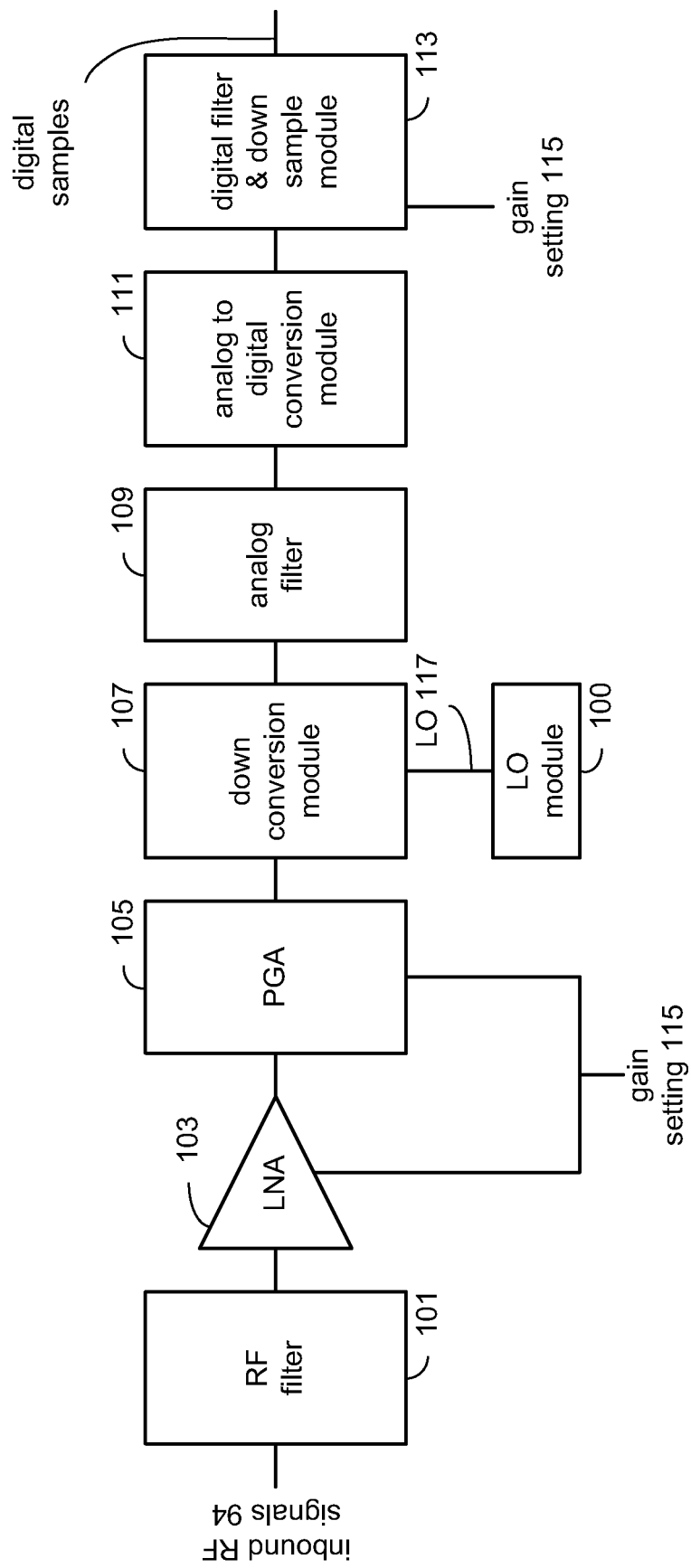
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
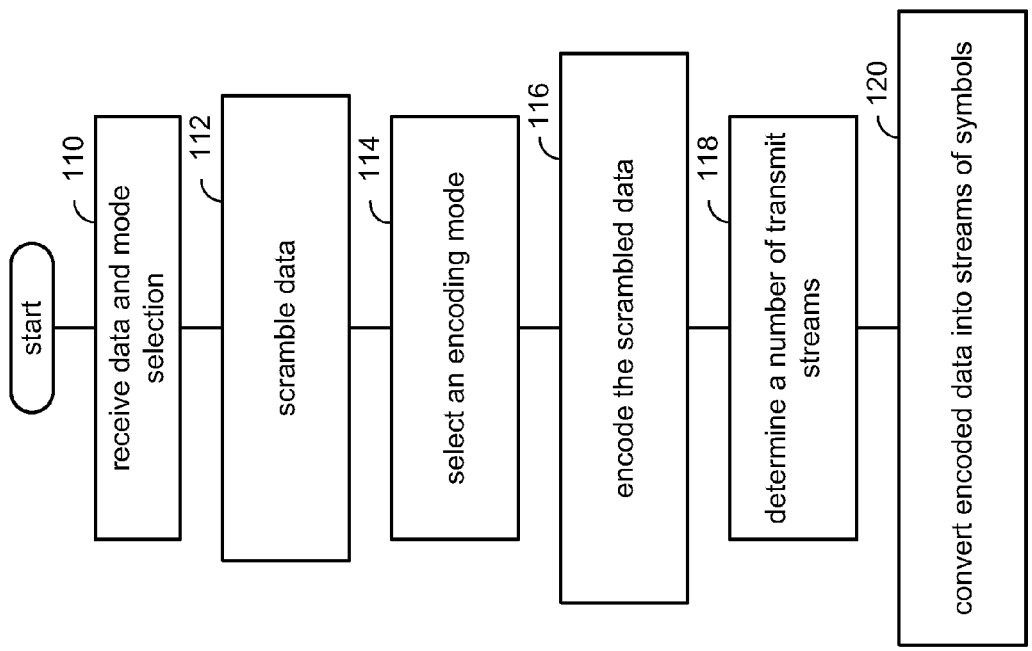
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
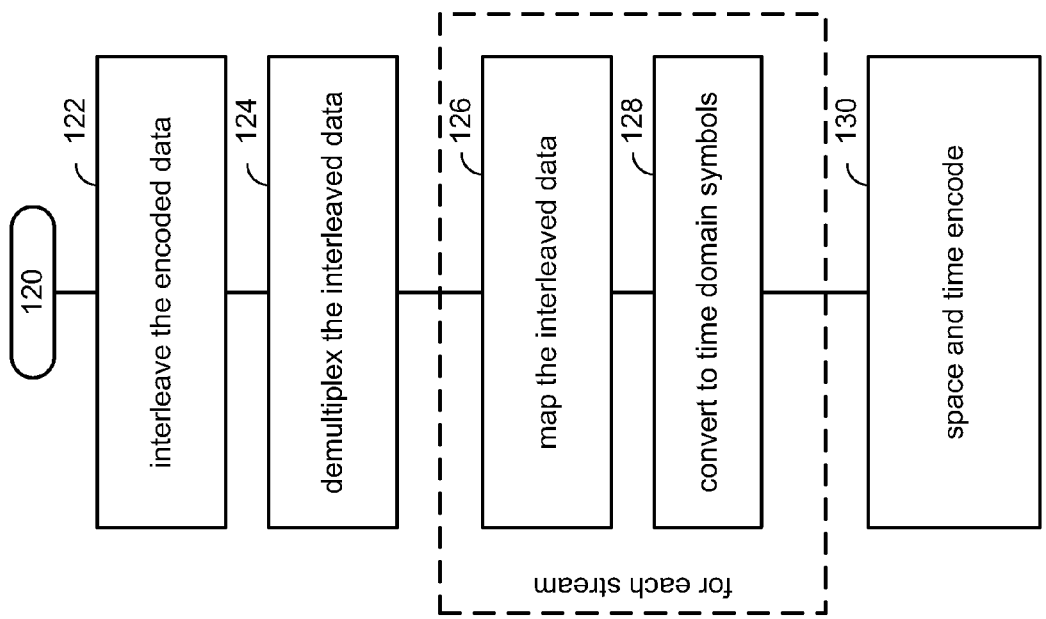
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \cdots & C_{2M-1} & C_{2M} \\ -C_2^* & C_1^* & -C_4^* & C_3^* & \cdots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
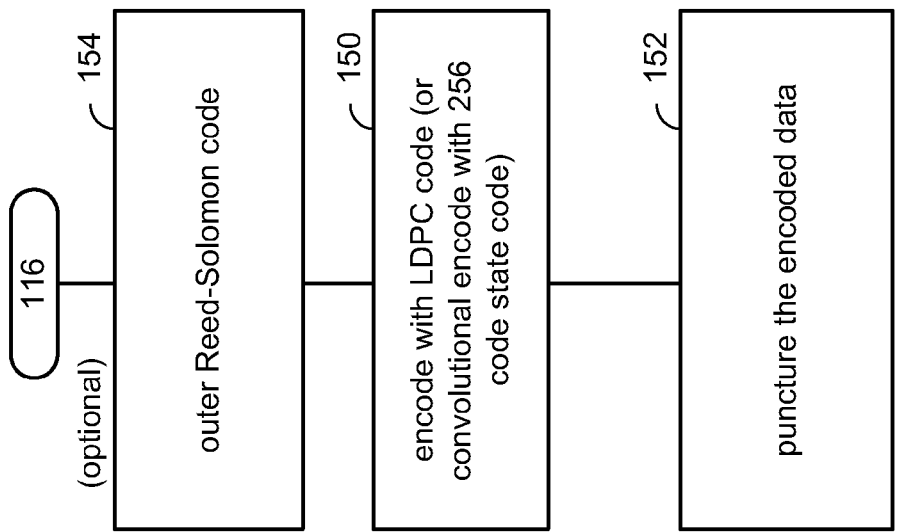
FIGS. 7-9 are diagrams illustrating various embodiments for encoding the scrambled data.
Figure 8:
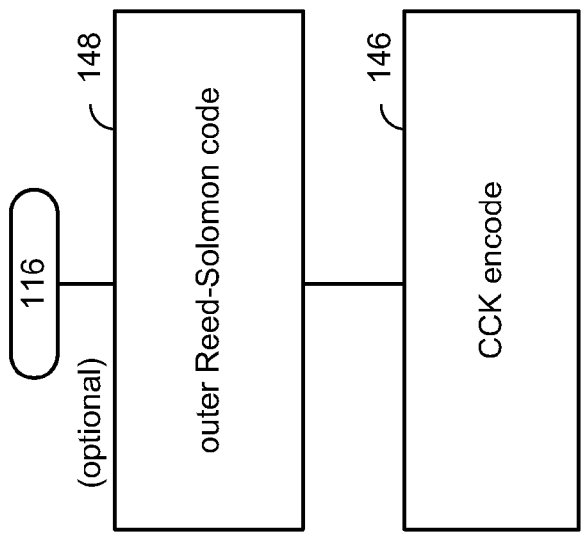
Figure 7:
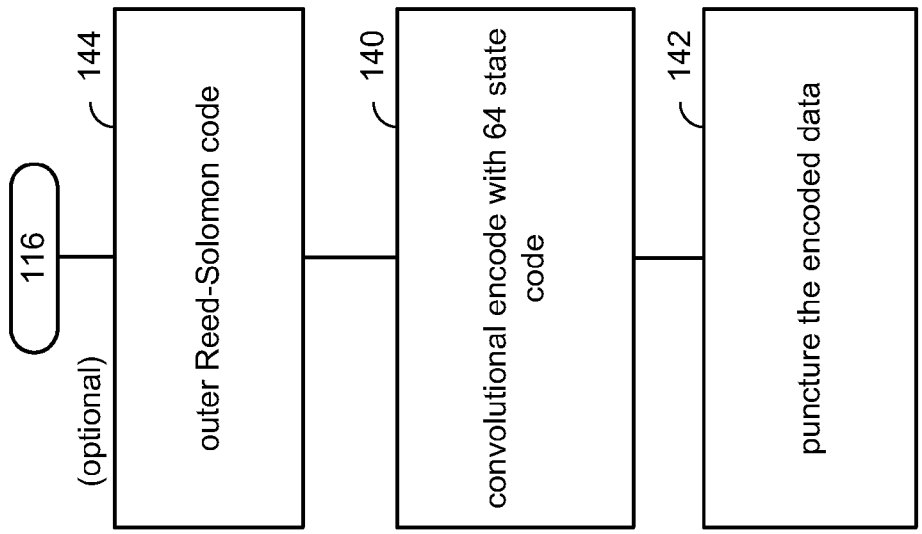

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
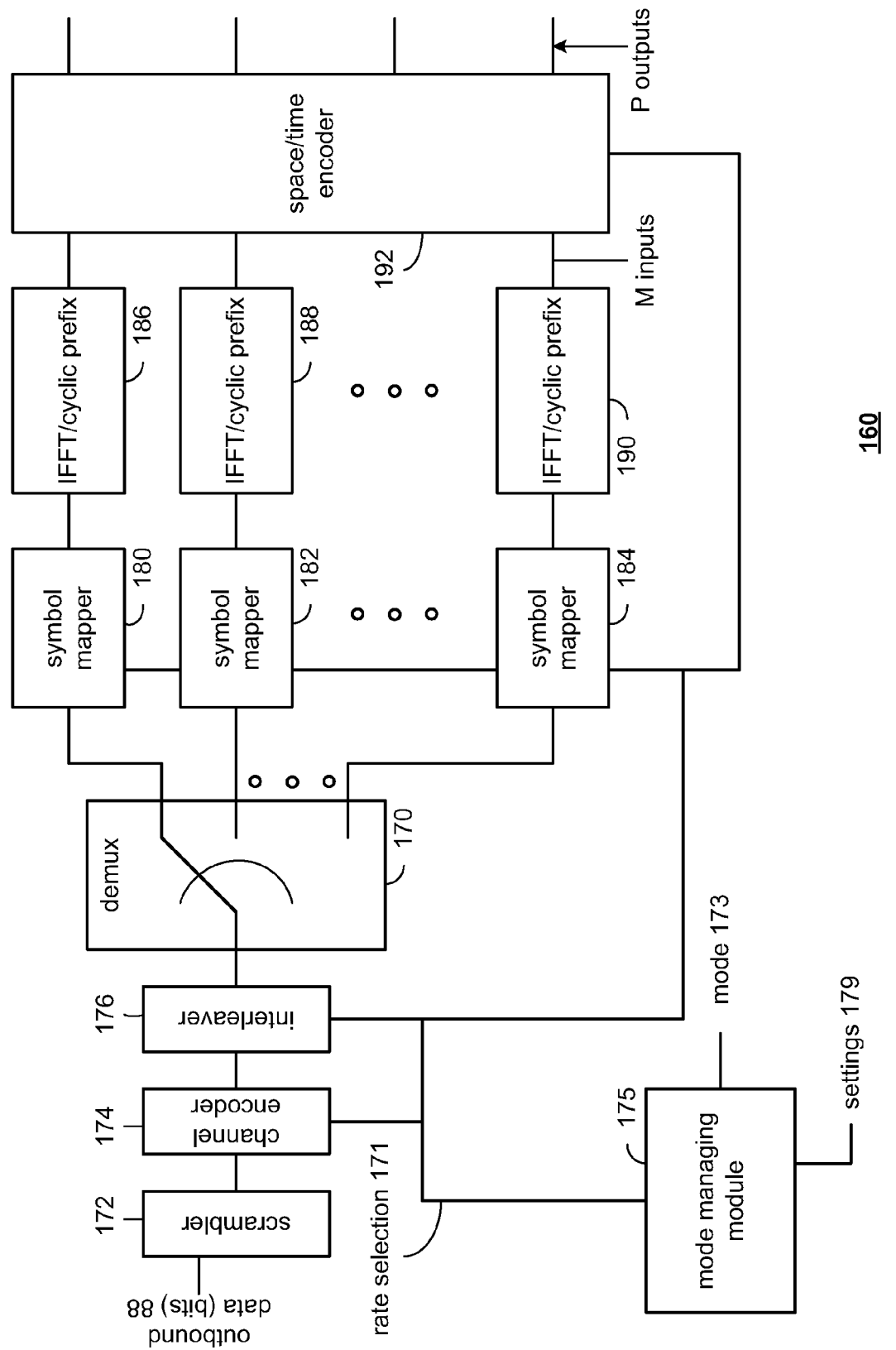
FIGS. 10A and 10B are diagrams illustrating embodiments of a radio transmitter.
Figure 10B:
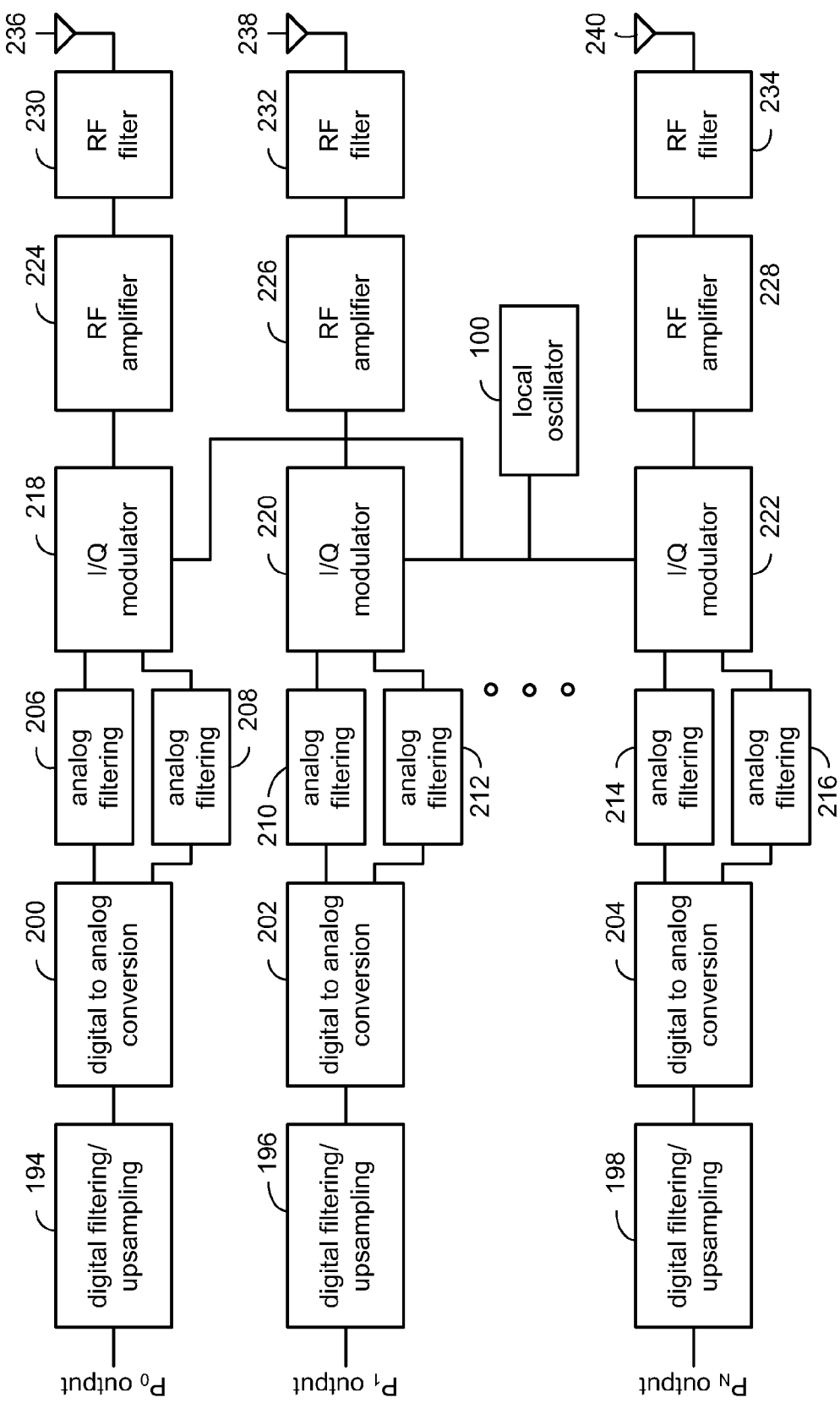

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \cdots & c_{2M-1} & c_{2M} \\ -c_2^* & c_1^* & -c_4^* & c_3^* & \cdots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
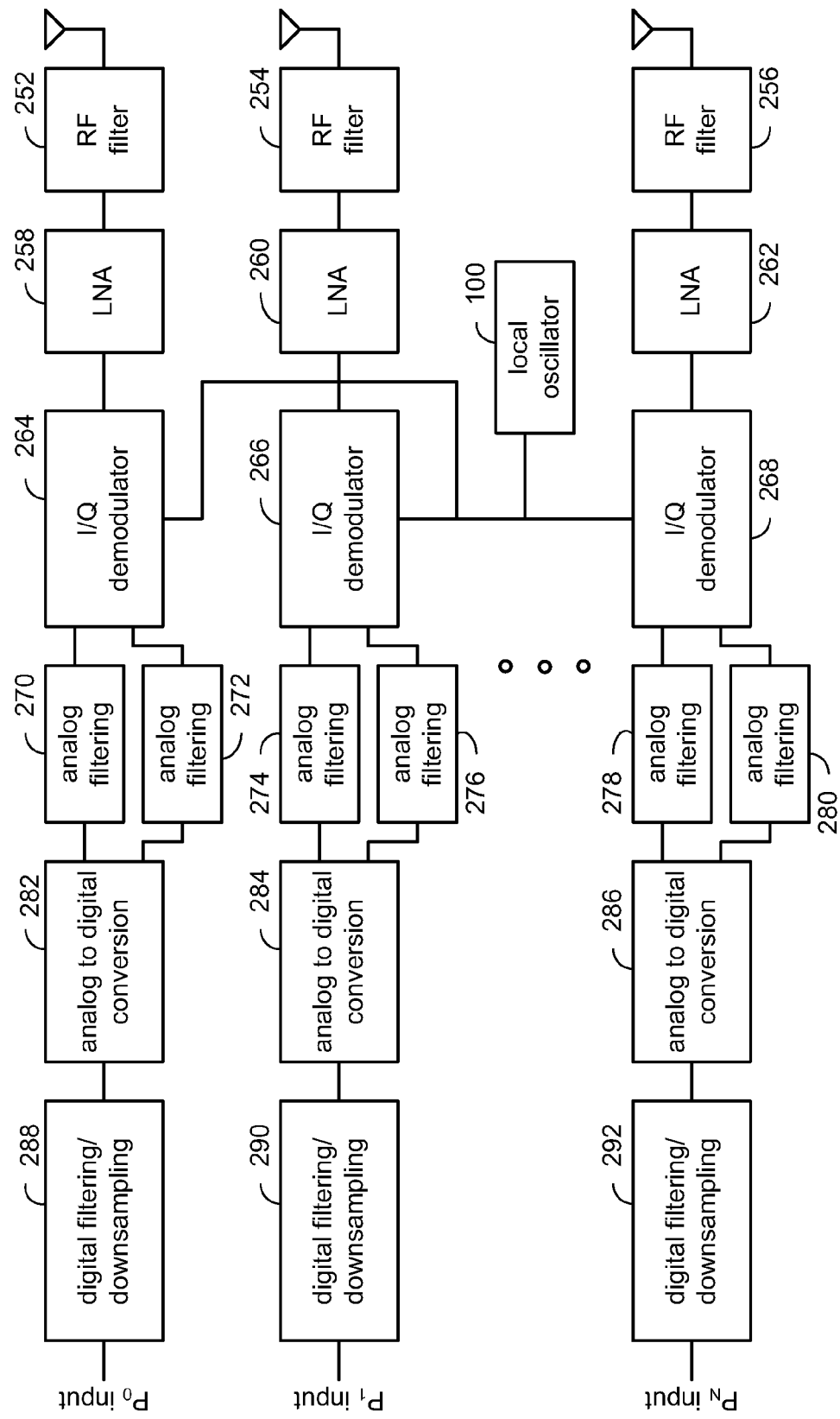
FIGS. 11A and 11B are diagrams illustrating embodiments of a radio receiver.
Figure 11B:
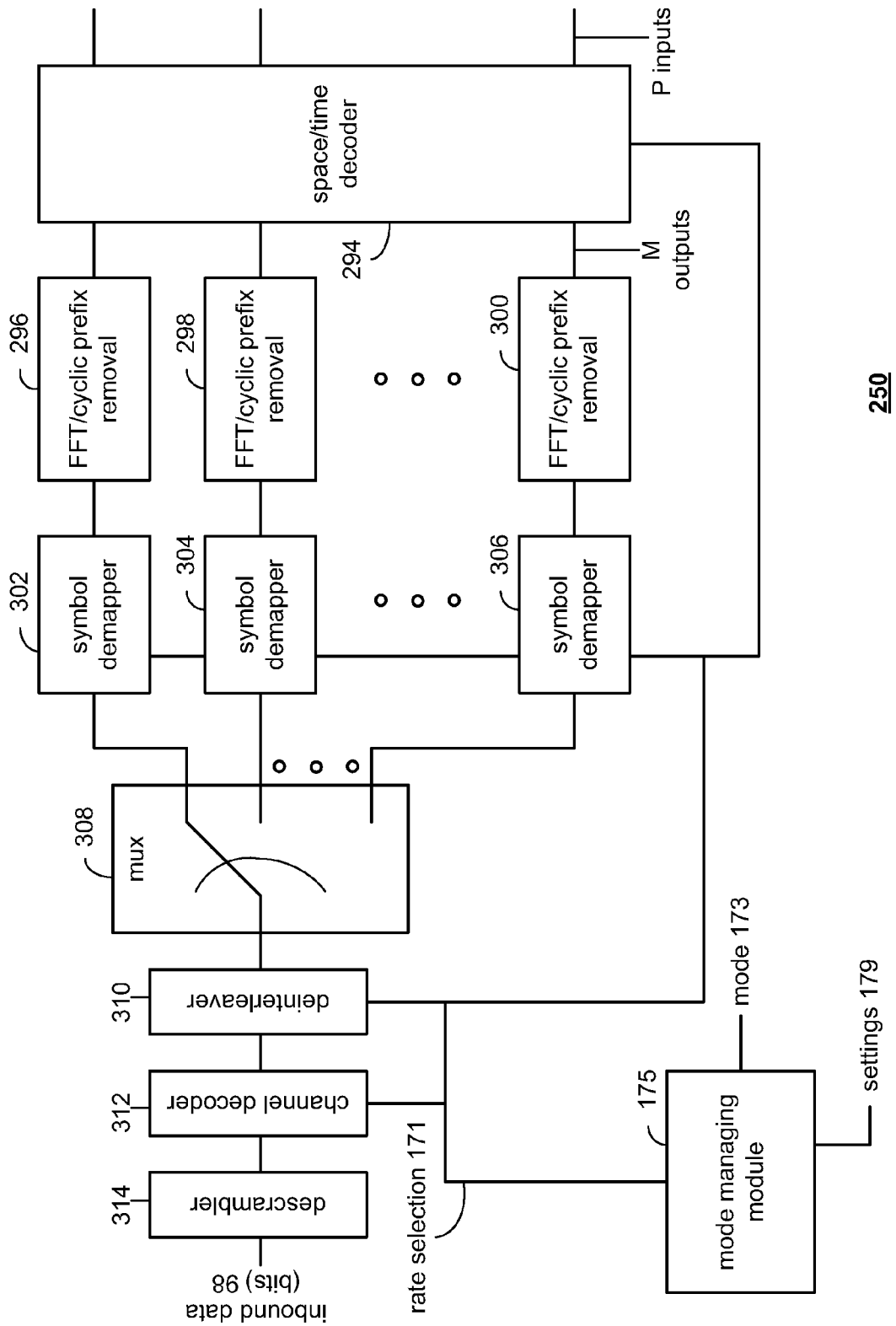

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
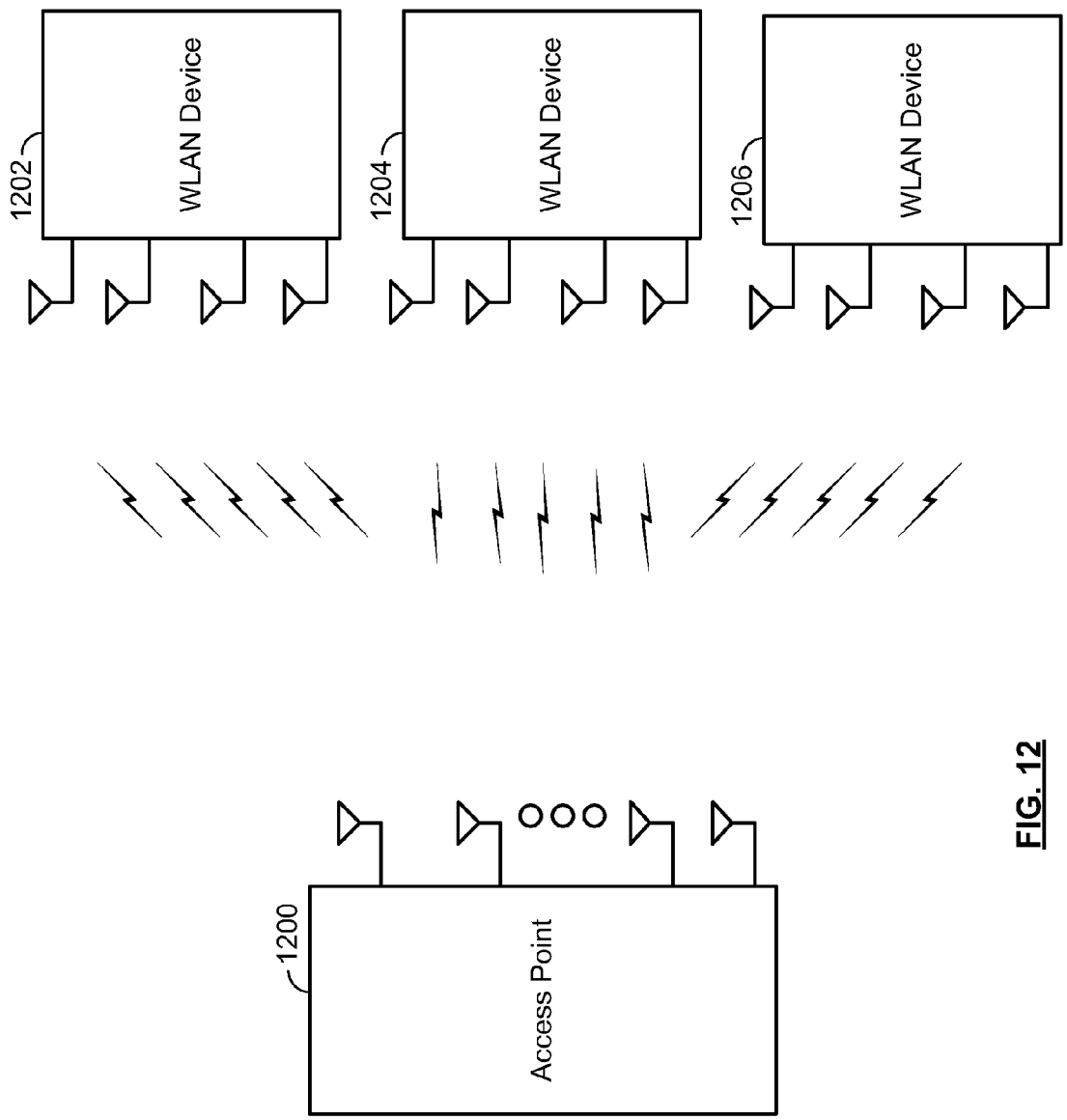
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Figure 13:
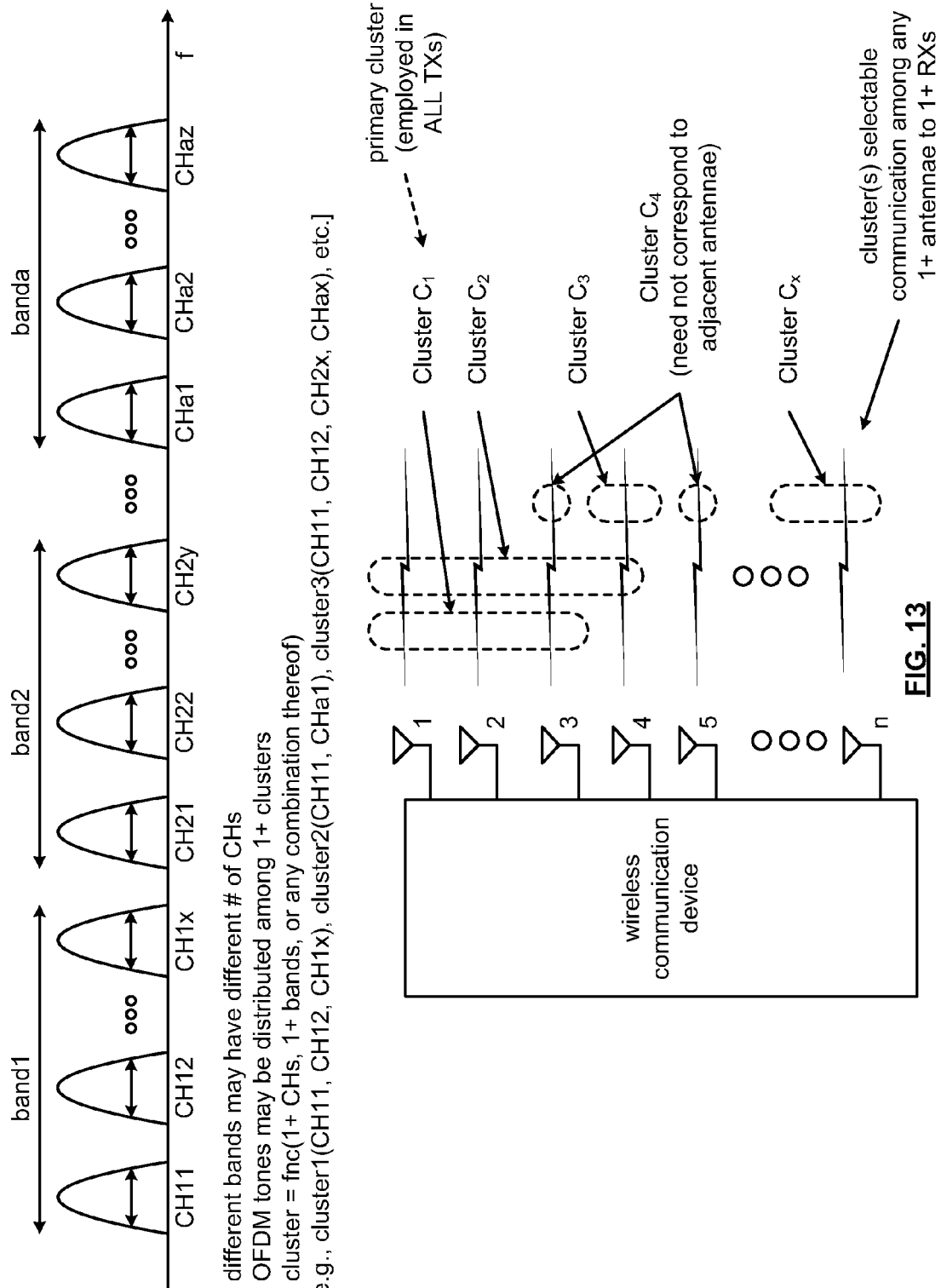
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Figure 14:
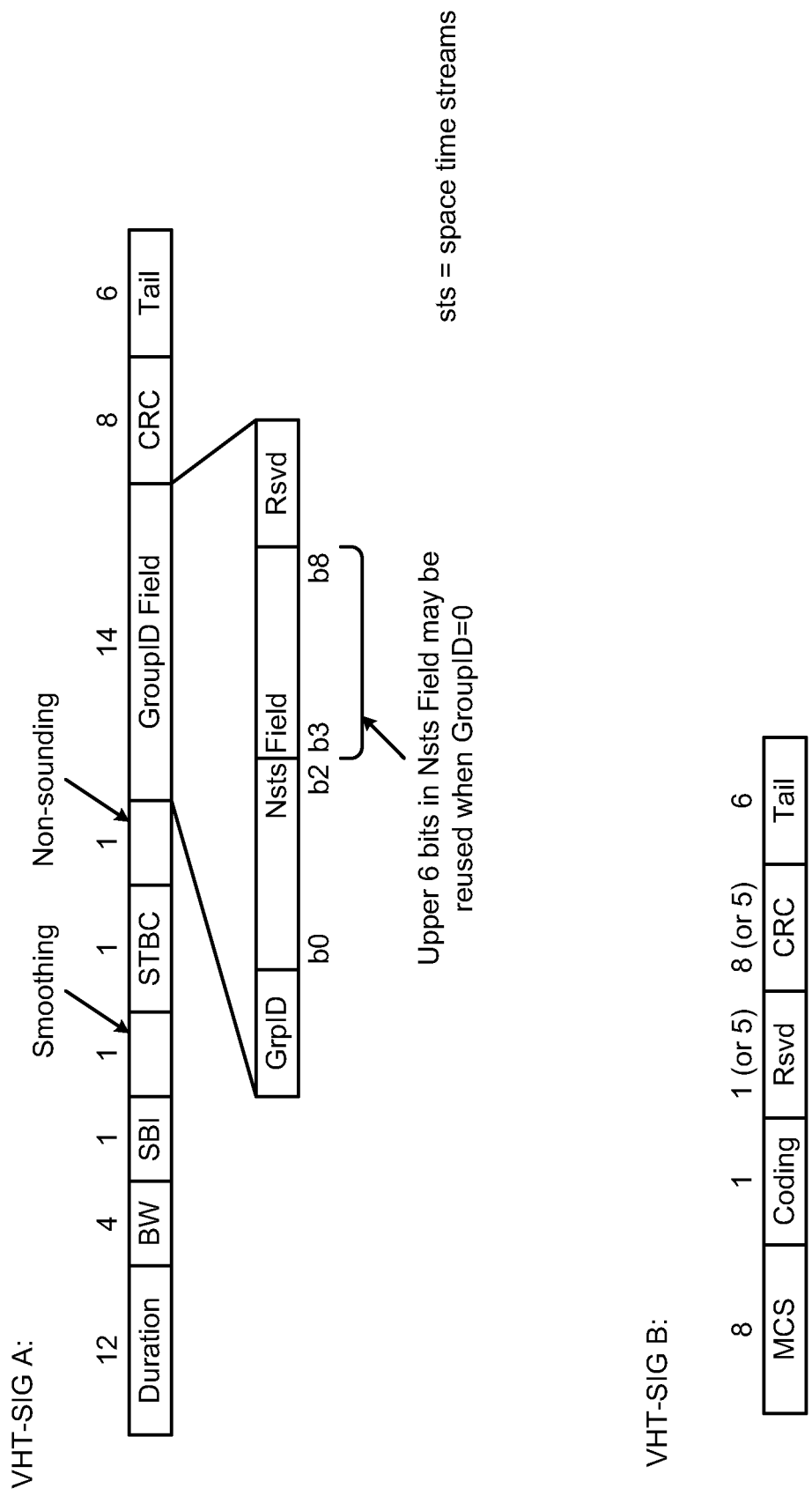
FIG. 14 is a diagram illustrating an embodiment of VHT-SIG A and VHT-SIG B fields used for sounding.

FIG. 14 is a diagram illustrating an embodiment of VHT-SIG A and VHT-SIG B fields used for sounding. With the structure of this diagram, a non-sounding bit is included in the VHT-SIG A field. When the non-sounding bit is set to 1, the packet is a SU/MU-MIMO DATA packet. Each recipient STA acknowledges it STA number by detecting a pre-assigned GroupID. If a pre-assigned group ID (NOTE: group ID, GroupID, Group ID, and/or their respective equivalents, may be used interchangeably herein) is not used, the GroupID=0 and only the first 3 bits of the Nsts field indicates the number of VHT-LTFs present in the structure.

When the non-sounding bit is set to 0 the packet is a sounding packet. For such operation, typically the GroupID=0 and the first 3 bits in the Nsts field indicates the number of VHT-LTFs to be sounded (other bits: b3-b8 can be used for some other feature). If the GroupID is non-zero (when the AP wants to reuse pre-assigned GroupID to sound STAs), all 9 bits in Nsts field are used. However, only Nsts_k for STA to be sounded are not zero and the number of VHT-LTFs=sum(Nsts_k).

From certain perspectives, the use of group ID and group definition fields in accordance with the various aspects resented herein may be viewed as moving addressing information from the media access control (MAC) to the physical layer (PHY) addressing information. This way, the receiving wireless communication device is operative to determine (e.g., at the PHY level) if it is an intended receiving wireless communication device and also how it is to process a received transmission.

In accordance with the description herein, unresolvable LTFs may be encountered and have respective advantages (e.g., having a shorter preamble) and disadvantages. Some disadvantages may include being incompatible with high-performance multi-user (MU) downlink processing methods, being incompatible with certain antenna configurations, and in some instances, being incompatible with interference suppression.

The # LTF symbols=$\max_i$(# spatial streams for user i). Each user can estimate HiQi reliably, assuming $\|H, Q\|=0$. This assumption may not be applicable for all antenna configurations.

In other embodiments that include resolvable LTFs (e.g., the number of LTFs>=total # of streams), a mechanism is employed to identify which streams are for which user. In some of the illustrations, embodiments of up to 8 transmit antennae on a transmitting wireless communication device (e.g., AP) are used and up to 4 receiving wireless communication devices (e.g., 4 users or STAs) are employed for MU-MIMO communications. Of course, it is noted that other embodiments may alternatively include different numbers of users, different numbers of transmit antennae, etc. without departing from the scope and spirit of the invention.

Figure 15:
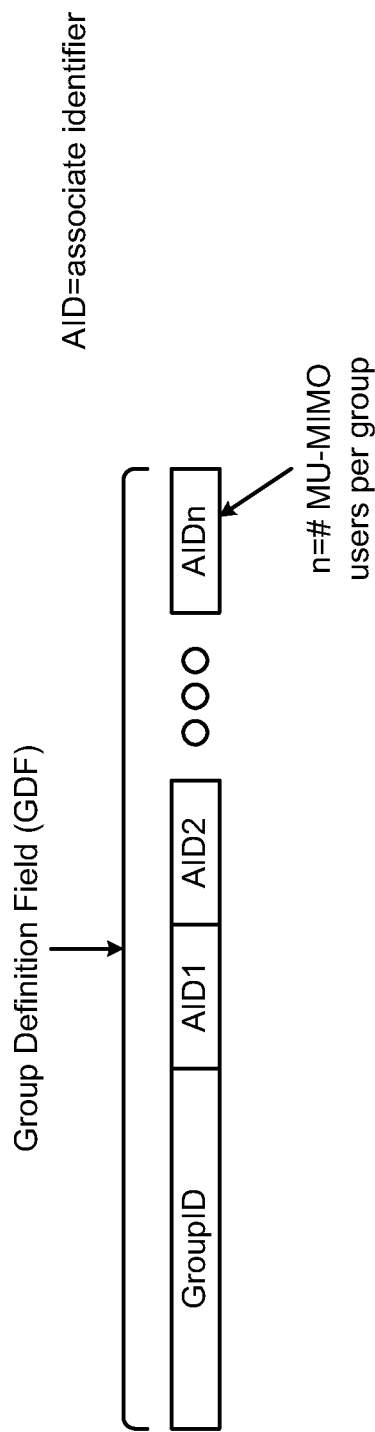
FIG. 15 is a diagram illustrating an embodiment of various group identification fields being transmitted to one or more receiving wireless communication devices.

FIG. 15 is a diagram illustrating an embodiment of various group identification fields being transmitted to one or more receiving wireless communication devices. a group definition field (GDF) may be defined as a group ID (e.g., y bits, where y is an integer) is used to specify a group of n MU-MIMO users in a specified order. The group ID is defined by the transmitting wireless communication device (e.g., AP) and is communicated to the receiving wireless communication devices (e.g., STAs). The GroupID is assigned by a transmitting wireless communication device (e.g., AP) and is then informed to the respective receiving wireless communication devices (e.g., STAs), either when such receiving wireless communication devices (e.g., STAs) join the basic services set (BSS) or when GroupID assignment is updated by a management frame sent by AP. The management frame employed to update/manage the GroupID assignment can be either a Broadcast frame or a Unicast frame. The group ID may be transmitted within the body of a management frame that may take any of a variety of formats including MU-MIMO, OFDMA, MU-MIMO/OFDMA, etc.

For example, such a management frame may be a multicast sounding frame (e.g., as described elsewhere herein), a non-sounding frame, or a unicast in the format of either sounding or non-sounding frame. In one embodiment, a management frame without sounding (non-sounding type) may be used to indicate an AID list (e.g., AID=STA identifier, such as an 11-bit association identifier AID) list for a group ID without requesting channel measurement feedback frame (e.g., when the management frame transmitter already has channel state information (CSI). A group ID is modified or created by transmitting a group-definition-field. Until a subsequent group-definition-field is received, the last received group-definition-field is used to interpret and analyze any received group ID. In some instances where the group ID may be overloaded, the transmitting wireless communication device (e.g., AP) may assign same group ID to mutually exclusive sets of users. For example, a receiving wireless communication device can be a member of up to $2^y$ groups, where y is an integer.

The group definition field (GDF) may be defined as follows: n number of MU-MIMO users per group (n=4 for example). Also, several GDFs may be transmitted in one management or sounding frame (e.g., for specifying different groups of users, etc.). Another field within the transmission may be used to indicate how many GDFs are included in the management or sounding frame. Upon reception of GDF, each of the receiving wireless communication devices (e.g., STAs) knows its own respective number (STA number), such as from 1-4 in this embodiment) associated with group ID. This STA number indicates the position of designated LTF if it belongs to the groupID in VHT-SIG-A.

Within the various diagrams and embodiments described and depicted herein, wireless communication devices may generally be referred to as WDEVs. It is noted that such wireless communication devices may be wireless stations (STAs), access points (APs), or any other type of wireless communication device without departing from the scope and spirit of the invention. The reference numeral convention associated with FIG. 16 (e.g., wireless communication device 1601 generally performing operations which may be associated with transmitting wireless communication devices such as APs, and other wireless communication devices 1602a, 1602b, 1602c, etc. generally performing operations which may be associated with receiving wireless communication devices such as STAs) is employed within various other diagrams for ease of illustration and understanding for the reader in providing a relatively analogous context in which various types of communications may occur.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Figure 16:
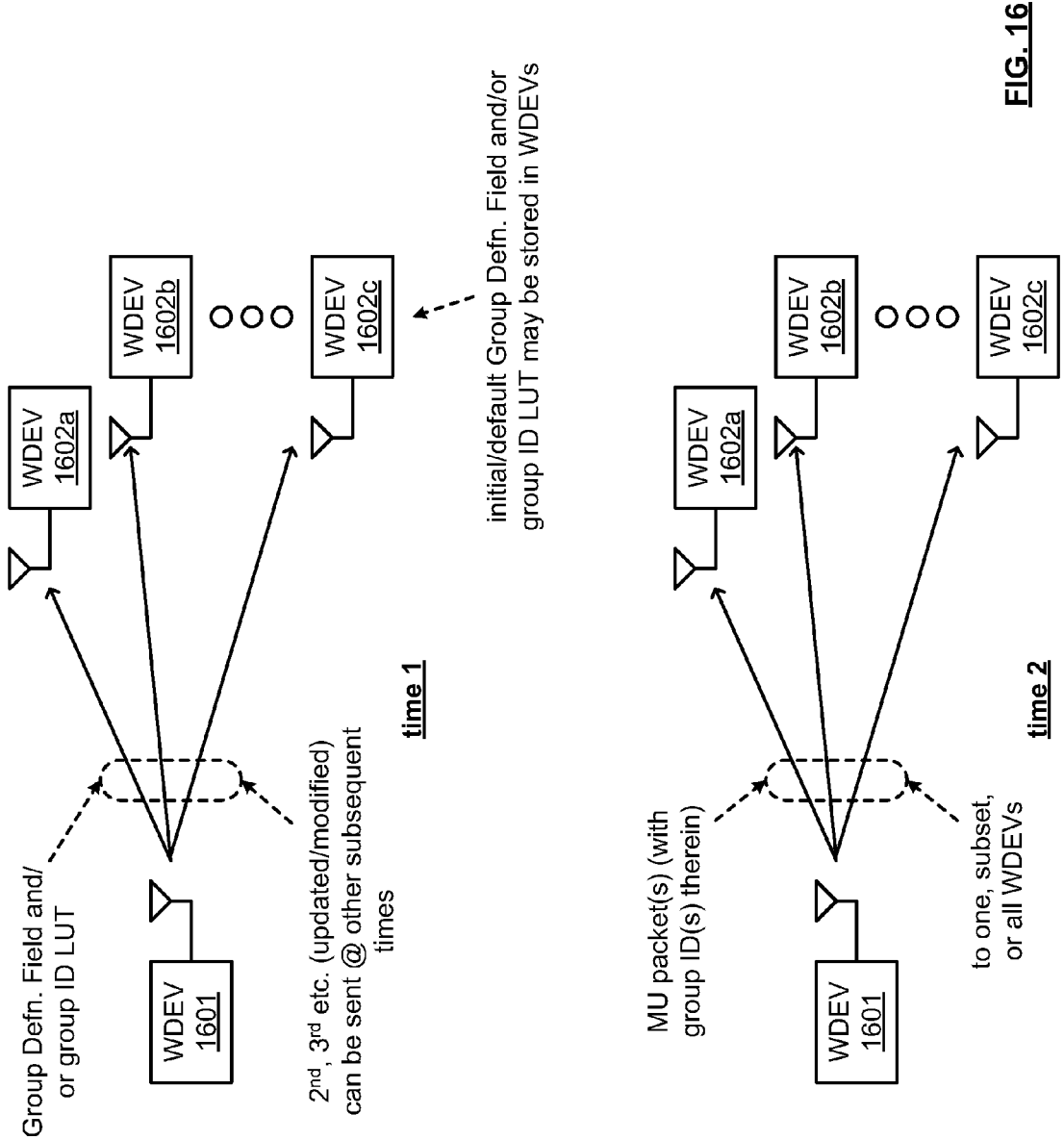
FIG. 16 is a diagram illustrating an embodiment of communications between various wireless communication devices within a communication system.

FIG. 16 is a diagram illustrating an embodiment of communications between various wireless communication devices within a communication system. Within this diagram, wireless communication device 1601 is operative to perform transmitting of a group definition field and/or a group identification field (group ID) look up table (LUT) to a plurality of wireless communication devices (shown as wireless communication devices 1602a, 1602b, 1602c, etc.). The group ID LUT may be viewed as being a table that provides a very efficient representation between the various subsets of the wireless communication devices (or users) and group IDs. For example, each respective group ID within the group ID LUT may correspond to one or more subsets of the wireless communication devices. When a particular wireless communication device is included within multiple respective subsets, it is located within a common location within each of those subsets. For example, if the wireless communication devices 1602a is located in a given location (e.g., the second location) within a particular subset, then that same wireless communication devices 1602a is located within the same location (e.g., the second location) within all other subsets that includes that same wireless communication device 1602a as well.

It is noted that the various wireless communication devices within a communication system employ a common group ID LUT when operating cooperatively with one another. That is to say, for coordinated operation in accordance with using the very efficient manner of associating various group IDs and wireless communication devices (or users), the various wireless communication devices all respectively need to have access to the group ID LUT. In embodiments in which the group ID LUT may be modified or updated (e.g., as a function of time such as every X number of seconds, after a particular event occurs, or based on some other consideration, etc.), then all of the various wireless communication devices should be employing the most recent or current group ID LUT for coordinated operation.

After the wireless communication device 1601 transmitting the group definition field and/or the group ID LUT to the plurality of wireless communication devices (e.g., such as shown at time 1), then the wireless communication device 1601 operates by transmitting a multi-user packet to the plurality of wireless communication devices (e.g., such as shown at time 2). Such a multi-user packet may be communicated in accordance with orthogonal frequency division multiple access (OFDMA) signaling, multi-user multiple input multiple output (MU-MIMO) signaling, combination thereof (such as OFDMA/MU-MIMO), etc. Such a multi-user packet includes at least one group ID therein that indicates, based on the group definition field or the group ID LUT, a first field of the multi-user packet to be processed by a first of the plurality of wireless communication devices (e.g., wireless communication device 1602a) and a second field of the multi-user packet to be processed by a second of the plurality of wireless communication devices (e.g., by wireless communication device 1602b).

As mentioned any one group ID may corresponds to more than one subset of the plurality of wireless communication devices. As will be seen elsewhere herein, a group ID may correspond to as few as one subset of wireless communication devices, or alternatively, to a plurality of subsets of wireless communication devices (e.g., to a first subset of wireless communication devices, and also to a second subset of wireless communication devices, etc.).

Also, based on the group ID, at least one additional field within the multi-user packet indicates a first at least one space-time stream (STS) within the multi-user packet corresponding to the first of the plurality of wireless communication devices and a second at least one STS within the multi-user packet corresponding to the second of the plurality of wireless communication devices. That is to say, when a given multi-user packet does in fact correspond to a given wireless communication device, then further details are provided to indicate which particular one or more STSs employed and corresponding to that particular wireless communication device. For example, within an N_sts field of a communication received from the wireless communication device 1601, a given recipient wireless communication device that is included within at least one subset of wireless communication devices corresponding to the group ID, then that recipient wireless communication device may consider the N_sts field in accordance with identifying a non-zero value therein to indicate which particular STSs correspond to that recipient wireless communication device.

Figure 17:
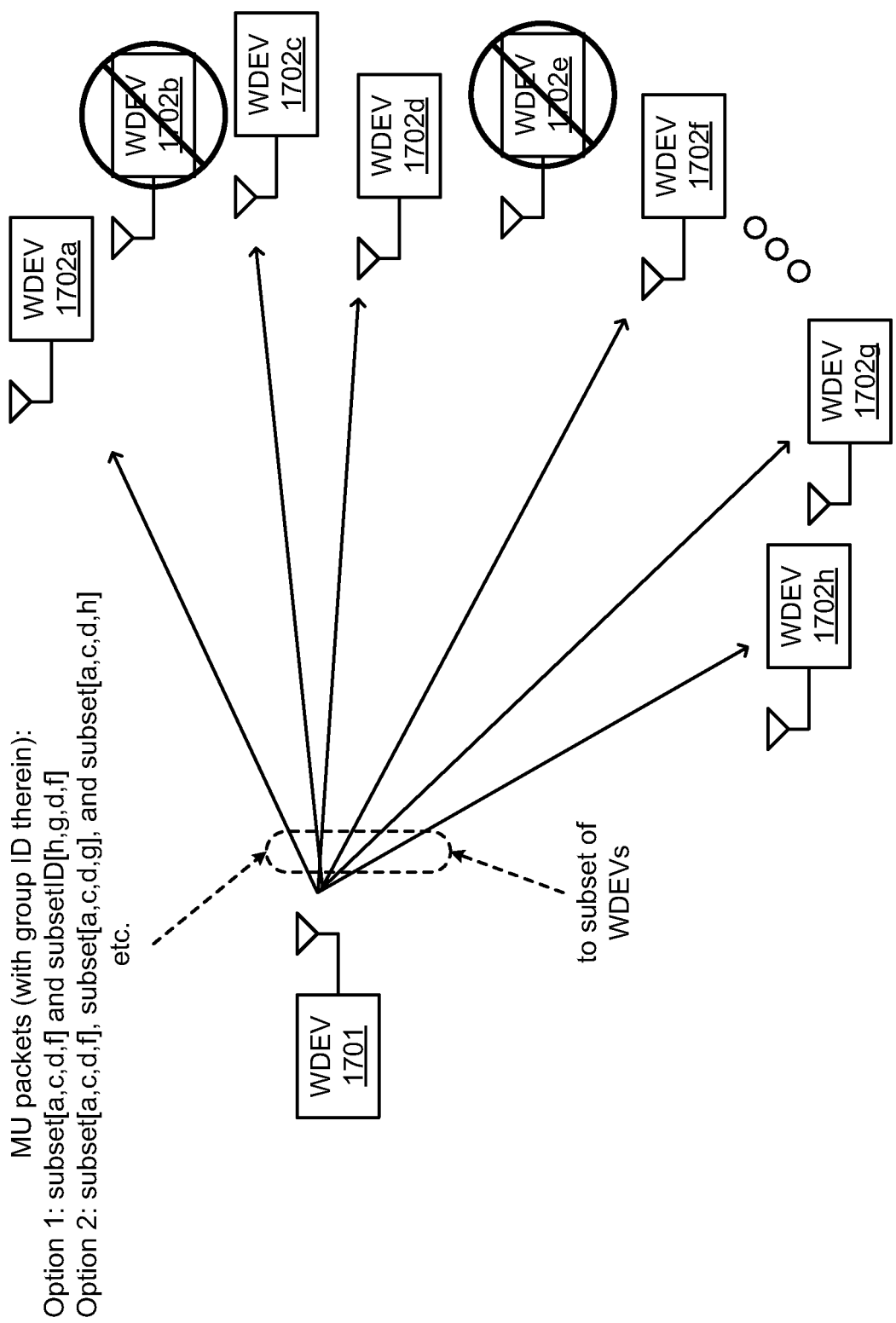
FIG. 17 is an alternative diagram illustrating an embodiment of communications between various wireless communication devices within a communication system.

FIG. 17 is an alternative diagram illustrating an embodiment of communications between various wireless communication devices within a communication system. This diagram shows different means by which different groups of wireless communication devices may be indicated by a group ID (such as included within a multi-user packet or other communication provided from wireless communication device 1701) to indicate that the communication is intended for that group of wireless communication devices.

In this embodiment, each respective subset of wireless communication devices includes up to 4 wireless communication devices. When the wireless communication device 1701 desires to provide a communication corresponding to more than 4 wireless communication devices, a single group ID can operate in accordance with overloading. That is to say, such a group ID may correspond to at least two subsets of wireless communication devices that, when considered together, include these more than 4 wireless communication devices.

Looking particularly at the embodiment of this diagram, the wireless communication device 1701 desires to provide a multi-user packet to some, but not all, of the wireless communication devices 1702a, 1702b, 1702c, 1702d, 1702e, 1702f, 1702g, 1702h, etc. (i.e., specifically only to wireless communication devices 1702a, 1702c, 1702d, 1702f, 1702g, 1702h, etc. in this embodiment). When considering a situation in which no more than 4 wireless communication devices are included within any one subset, then a variety of subset combinations may be associated with a group ID to indicate communications to such a group of wireless communication devices (including more than 4 wireless communication devices). Some examples are provided: an option 1 includes two subsets [a, c, d, f] and [h, g, d, f]; an option 2 includes three subsets [a, c, d, f], [a, c, d, g], and [a, c, d, h].

For example, the subset [a, c, d, f] corresponds to wireless communication devices 1702a, 1702c, 1702d, and 1702f. The subset [h, g, d, f] corresponds to wireless communication devices 1702h, 1702g, 1702d, and 1702f. The inclusion of wireless communication devices within other of the subsets may be understood analogously by the reader. As may be seen, when a given wireless communication device is included within more than one particular subset, it is located within the same location within each of those particular subsets.

FIG. 18 is a diagram illustrating an embodiment of an alternative frame format that can be transmitted as a management frame, in either unicast or broadcast format, by AP. When only a single group ID is being defined within a communication, then a typically constructed management frame format may be employed. However, such a typical management frame is rather inefficient for defining a range of group IDs (e.g., when multiple Group IDs are to be defined). Herein, an alternative frame format with more flexibility is provided for more efficiently defining multiple group IDs. Such a more efficient implementation may be especially useful for doing on-the-fly scheduling, in such instances in which a transmitting wireless communication device (e.g., AP) decides which wireless communication devices or users to group together on a frame-by-frame basis. As shown within this diagram, 4 bits are employed for depicting the respective particular groupIDs to be updated or redefined. However, different and other numbers of bits may alternatively be employed without departing from the scope and spirit of the invention. For each respective receiving wireless communication device (e.g., STA) identified by AID (11 bits) or MAC address (48 bits), this frame gives the location information for that particular receiving wireless communication device (e.g., STA) at each groupID, which requires only 2 bits per groupID. The range of 2 bits indicates 0 to 3, which implies the $1^{st}$ position to the $4^{th}$ position, respectively.

FIG. 19 is a diagram illustrating an embodiment of group ID and user table, which is fixed in the communication protocol, specification, and/or recommended practices, rather than managed/updated via a wireless transmission (e.g., over the air) by one of the wireless communication devices (e.g., AP). This diagram considers a communication system embodiment with 7 wireless communication devices or users (e.g., 7 receiving wireless communication devices and at least one AP). It may be desired for the transmitting wireless communication device (e.g., AP) to mix-and-match up to 4 wireless communication devices or users on the fly (e.g., in real time), depending on the data traffic, without transmitting a new management frame every time it selects a new combination of users.

For example, there are 35 possible combinations or subsets that each include 4 of the wireless communication devices or users out of the total of 7 wireless communication devices or users. For example, it is possible to accommodate all 35 combinations with 7 respective group IDs. It is noted that, for every possible combination of users, there is at least one group ID for which each user has a unique order value. For example, the subset of 4 users (1, 2, 4, 6) is supported by group ID 2 as may be seen in the diagram.

It is of course noted that the embodiment of this diagram is just one example of a table that can support all combination of users, and is certainly not a unique implementation. The number of group IDs needed to support all combinations of a given number of users may not be determined straightforwardly in all embodiments. The embodiment of this table was generated using a simple 'greedy' algorithm with a random initial state. As can be seen, this embodiment does in fact support all 35 possible combinations.

FIG. 20 is a diagram illustrating an embodiment of the group ID and user table of FIG. 19 in an alternative format. In this example, the table on the previous embodiment and diagram may be employed using a previously-defined management frame format. This table uses bogus MAC addresses as spacers, and it includes 3528 bits total. As can be seen, this table is quite large in size, and may be consumptive of communication channel bandwidth and processing resources.

FIG. 21 is a diagram illustrating an embodiment of the group ID and user table of FIG. 19 and FIG. 20 in yet an alternative format. This diagram is an alternative frame format embodiment using the same data. In this given example, only 446 bits (compared to 3528 bits of the previous embodiment).

Figure 22:
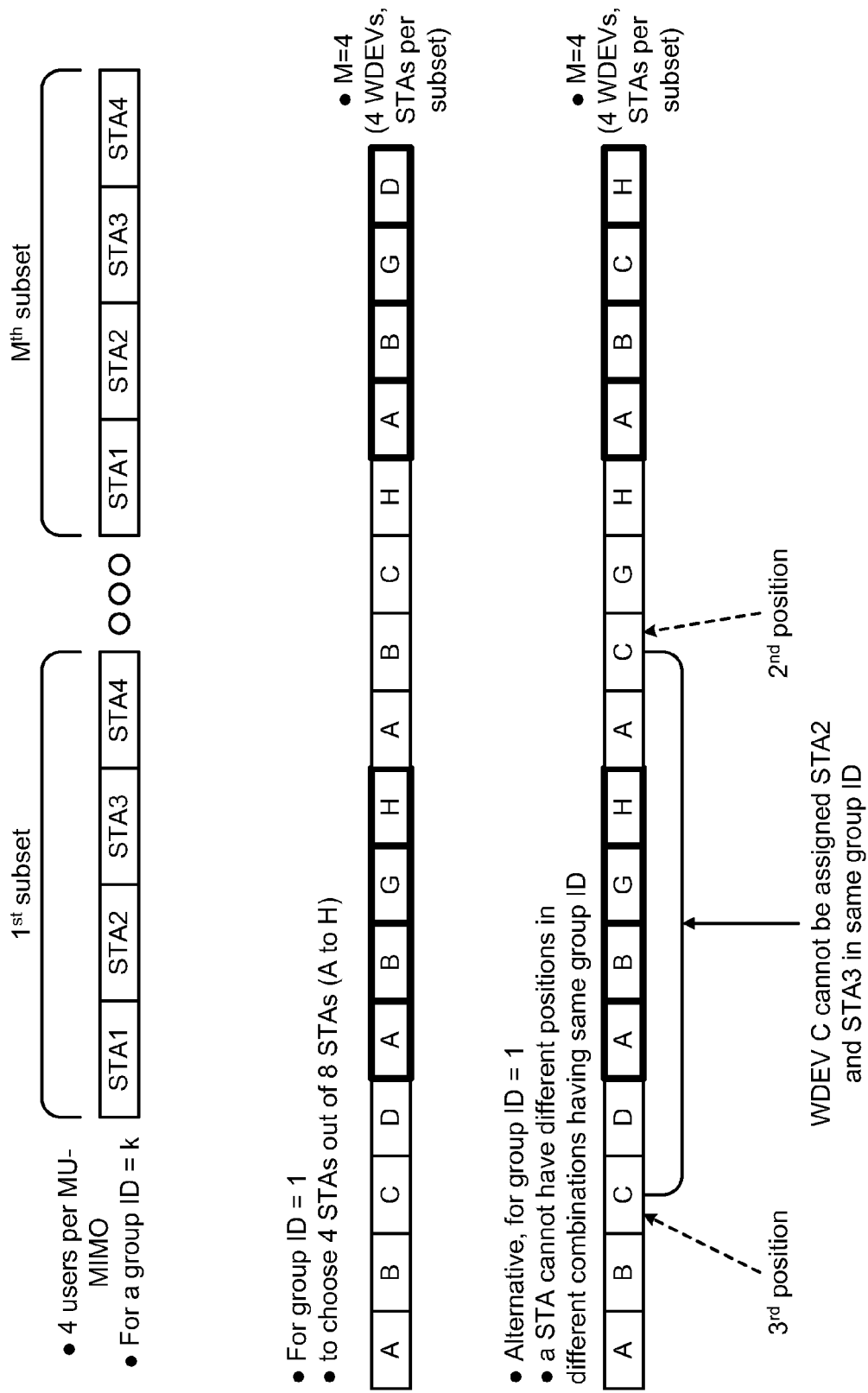
FIG. 22 is a diagram illustrating an embodiment of a group ID corresponding to a plurality of subsets of wireless communication devices.

FIG. 22 is a diagram illustrating an embodiment of a group ID corresponding to a plurality of subsets of wireless communication devices. A group ID included in the preamble of a multi-user packet identifies the locations of streams for each user within the multi-user packet (e.g., which may be OFDMA, MU-MIMO, combination, etc.). As may be seen, a given group ID may correspond to more than one subset of wireless communication devices by also providing for power savings. In a finite precision system (e.g., a digital system using bits to communication information), the number of combinations of subsets of wireless communication devices is limited by the number of bits used for a group ID.

However, in a real-world/actual wireless communication system, a finite (not infinitely/terribly large) number of groups of wireless communication devices may be typical and capable to represent the respective the vast majority (if not all) combinations of such wireless communication devices. That is to say, a finite (and not extremely large) number of subsets of wireless communication devices will typically be sufficient to cover all possible combinations of wireless communication devices. As may be seen in various subsequent embodiments, when considering a communication system with as many as 8 wireless communication devices (e.g., 8 STAs in addition to an AP), then a total of 70 subsets of wireless communication devices can be sufficient to represent all possible combinations of those 8 wireless communication devices.

When considering a communication system having a coherence time in the range of 400~600 msec, channel state information (CSI) from the various wireless communication devices (e.g., STAs) within the communication system may be viewed as typically being valid for up to an approximate 20 msec time interval. For example, MU (e.g., OFDMA, MU-MIMO, etc.) communication system performance can be quite sensitive to the channel staleness. Also, in considering CSI feedback overhead from the various participating wireless communication devices (e.g., STAs), DATA traffic and the packet length, there may not typically be many MU (e.g., OFDMA, MU-MIMO, etc.) transmissions within 20 msec.

In an embodiment that considers the total number of subsets or groups of wireless communication devices (e.g., STAs) more seriously than power saving, the number of bits employed for a given group ID may be increased and/or multiple groups may be per group ID may be assigned (e.g., in accordance with overloading such as described elsewhere herein.

In many of the exemplary embodiments described herein, a maximum number of wireless communication devices per subset is set at 4 (e.g., M=4, such that 2 bits may be used to indicate each respective location therein), and a maximum number of wireless communication devices to be grouped together is set at 8 (e.g., G=8). However, the reader will of course understand that these numbers of merely exemplary, and alternative number of wireless communication devices per subset and number of wireless communication devices to be grouped together may be different in different embodiments without departing from the scope and spirit of the invention (e.g., for any desired numbers for M and G).

Continuing with the illustrative embodiment of each respective subset including at maximum 4 wireless communication devices, the STA number (shown at the top of the diagram varies from 1 to 4). This number indicates the location of the space-time streams (STSs) for the respective STAs within a particular my (e.g., MU-MIMO) data packet.

The value, MU_STA_ID (varying from A to H for an embodiment including up to 8 wireless communication devices to be grouped, such as A for first STA, B for second SAT, etc.), indicates the STA to be grouped by the group ID. This value, MU_STA_ID, is used for the group definition in the group ID LUT.

The value, MAC_ID, identifies the unique STA. Alternatively, an association identifier (AID) can be used for a shortened format.

A concrete example is provided below as an example. Consider a basic services set (BSS) having 100 STAs (e.g., 100 different MAC_IDs), the transmitting wireless communication device (e.g., AP) chooses 8 STAs to be grouped (e.g., 8 respective MU_STA_IDs) depending on any desired parameters such as DATA traffic, spatial correlation, priority, etc. In the MU (e.g., MU-MIMO) data packets, the respective group IDs therein identify the STA number for that particular value of MU_STA_ID. As may be seen, the value, MU_STA_ID, associates the STA number with the MAC_ID for each respective wireless communication device.

All combinations for the respective groups or subsets of the wireless communication devices can be determined in the group ID LUT, which shows the relationship of MU_STA_ID and STA number, as a function of the group ID.

The transmitting wireless communication device (e.g., AP) has to link MU_STA_ID with MAC_ID. This can be done in the sounding/management frame. For example, a transmitting wireless communication device (e.g., AP) may provide such information regarding the linking or association between the MU_STA_ID and MAC_ID within a sounding/management frame provided to the various wireless communication devices (e.g., STAs) within the communication system.

Referring again to the top of the diagram, a given group ID may include multiple groups or subsets of wireless communication devices. For example, a given group ID may correspond generally to as many as M subsets of wireless communication devices. That is to say, the group ID # k (i.e., group ID=k, where k is an integer) corresponds to each of a $1^{st}$ subset, a $2^{nd}$ subset, and up to an $M^{th}$ subset. Therefore, multiple subsets of wireless communication devices can be defined in a given group ID as described herein with a following rule: within the same group ID, a rep STA can be assigned in multiple subsets of wireless communication devices as long as it retains the same STA number within each of those subsets of wireless communication devices (e.g., to avoid parallel decoding process).

For example, to choose 4 users or STAs out of users or 8 STAs (A to H) for group ID=1, a possible group of subsets can be assigned as shown in the middle portion of the diagram. However, as may be seen at the bottom portion of the diagram, the bottom example does not comply with the rule described above, in that, the wireless communication device C cannot be assigned to STA2 and STA3 in different respective subsets within the same group ID. For example, wireless communication device C corresponds to STA3 position in the first subset, and wireless communication device C corresponds to STA2 position in the third subset. It would be split these subsets of wireless communication devices into at least two separate groups.

FIG. 23 is a diagram illustrating an embodiment of a group ID look up table (LUT). Operating in accordance with the principles as described herein. As few as 11 different group IDs is sufficient to represent all 70 possible combinations of the 8 users or STAs (A to H). This embodiment is certainly not unique, and alternative embodiments may instead be employed that may include even fewer group IDs or more group IDs. Regardless of the particular implementation desired, it may be seen that a finite number of subsets of wireless communication devices may be employed to represent all possible combinations.

Also, if it would be preferable for the transmitting wireless communication device (e.g., AP) to apply power saving for certain combinations, then one or more un-assigned group IDs can be used. For example, referring particularly to this embodiment that includes 11 group IDs, if the transmitting wireless communication device (e.g., AP) makes a new groupID=12 with certain combinations associated with group ID=1 (i.e., [ABCD, AFCD, ABGD, and ABCH]), then a STA_A can drop the packet early when it receives a packet with GroupID=1.

Within this, and within other embodiments, it is noted that a group ID=0 may be employed for indicating a broadcasting packet.

FIG. 24 is a diagram illustrating an alternative embodiment of a group ID LUT. As may be seen, the embodiment of the previous diagram is not a unique representation of a group ID LUT that is operative to represent all 70 possible combinations of the 8 users or STAs (A to H). This embodiment includes more group IDs (13 in total: 1-11 and 14, 15, or 15 if considering the group ID 12 and 13 being reserved) as compared to the previous embodiment. Again, any of a variety of different combinations may be employed in generating a group ID LUT in accordance with the principles presented herein.

FIG. 25 is a diagram illustrating yet an alternative embodiment of a group ID LUT. Again, the embodiment of the previous two diagrams are not unique representations of a group ID LUT that is operative to represent all 70 possible combinations of the 8 users or STAs (A to H). The embodiment of this diagram includes more group IDs (13 in total: 1-11 and 14, 15, or 15 if considering the group ID 12 and 13 being reserved) as compared to the embodiment of FIG. 23. All 70 combinations ($_8C_4$) are grouped with 11 group IDs plus 2 extra group IDs (i.e., group ID 14 and 15). With this group ID LUT, there may be less chance in requiring require 2 NDP sounding frames for use in accordance with channel sounding.

Again, any of a variety of different combinations may be employed in generating a group ID LUT in accordance with the principles presented herein.

In this embodiment, there are certain STAs that share the same position within certain respective subsets of wireless communication devices (see right hand side of diagram). All 28 ($_8C_2$) pairs exist to share the STA # position.

Figure 26:
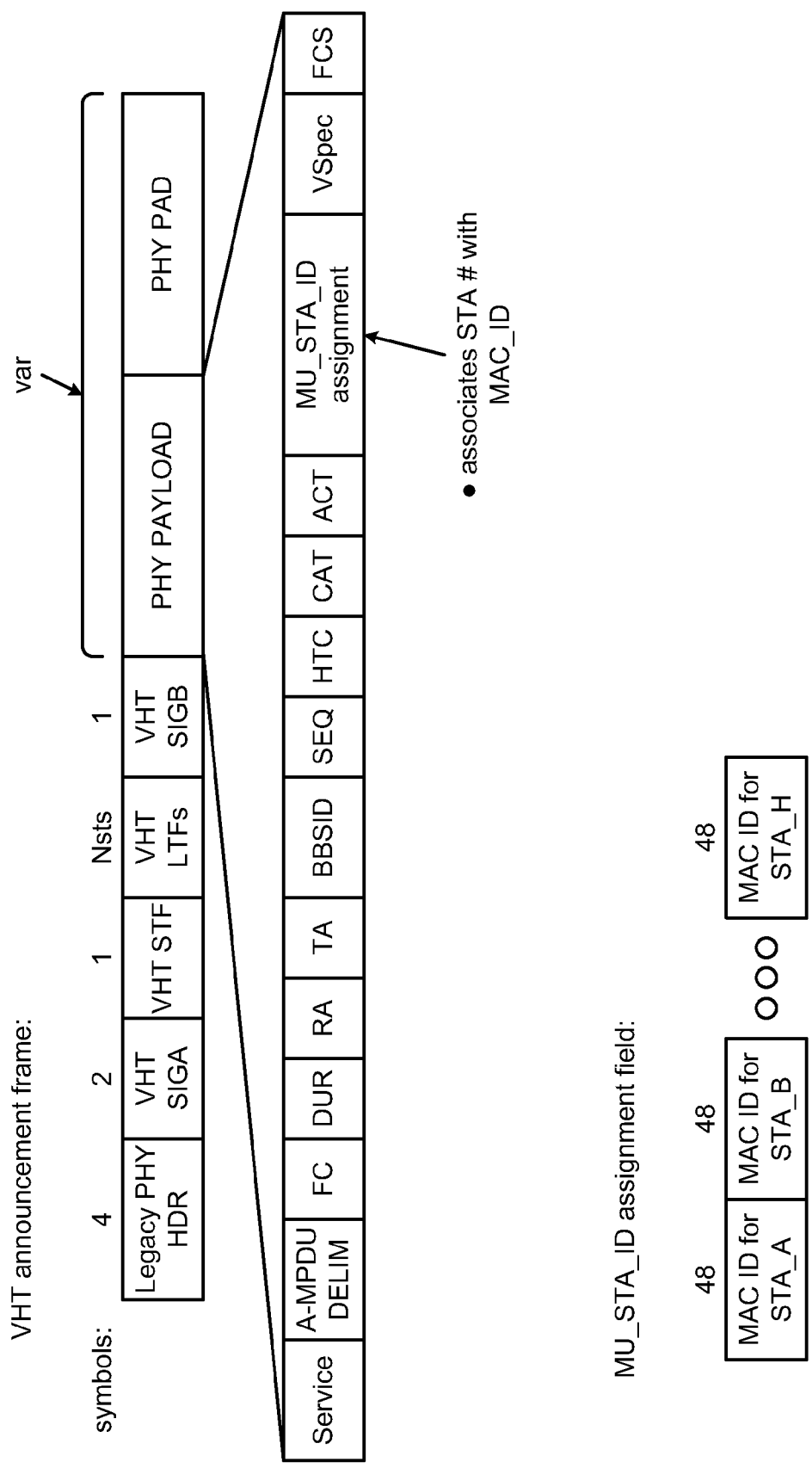
FIG. 26 is a diagram illustrating an embodiment of an announcement frame.

FIG. 26 is a diagram illustrating an embodiment of an announcement frame. The announcement frame may be a VHT announcement frame. This shows one possible embodiment of a MU-NDP management action frame such as may be employed to provide the values of MU_STA_ID, thereby associating the STA number with the MAC_ID for each respective wireless communication device.

The form of such a MU-NDP management action frame may be HT_GF, HT_MF or VHT format (for HTC field). The receiver address (RA) may be set to broadcast to announce the MU_STA_ID assignment being forthcoming. HTC is present to announce NDP frames. A maximum number of NDPs may be set to a predetermined value such as 2, to cover all possible STA combinations for sounding. An additional bit may be used in the HTC field.

For embodiments in which a CTS response is required after a MU-NDP management action frame yet before transmitting any NDP sounding frames, the indication of such a requirement of CTS response (e.g., "CTS response required") may be indicated in the HTC field.

Additional fields may be included therein including CAT, for category, such as VHT, and ACT, for action, such as indicating a MU_STA_ID assignment forthcoming.

As shown with respect to the lower portion of the diagram, the MU_STA_ID assignment field is operative to assign the MU_STA_ID with MAC_ID as described herein with respect to linking MU_STA_ID with MAC_ID using MAC address. As mentioned elsewhere herein as well, association identifier (AID) may alternatively be used for a shorten format for MAC_ID. For example, if the number of STAs to be grouped is less than 8, then the corresponding STAs can be filled with a bogus MAC_ID (e.g., all zeros). Alternatively, another field (e.g., 4 bits to cover values 0 to 8) in the beginning may be employed to indicate how many MU_STA_IDs are to be assigned (from STA_A to STA_X, where X can be A, B, . . . , H).

The field, VSpec may be employed for identifying or setting certain vendor specific elements. The frame check sequence (FCS) field closes out the PHY payload section of the announcement frame.

Figure 27:
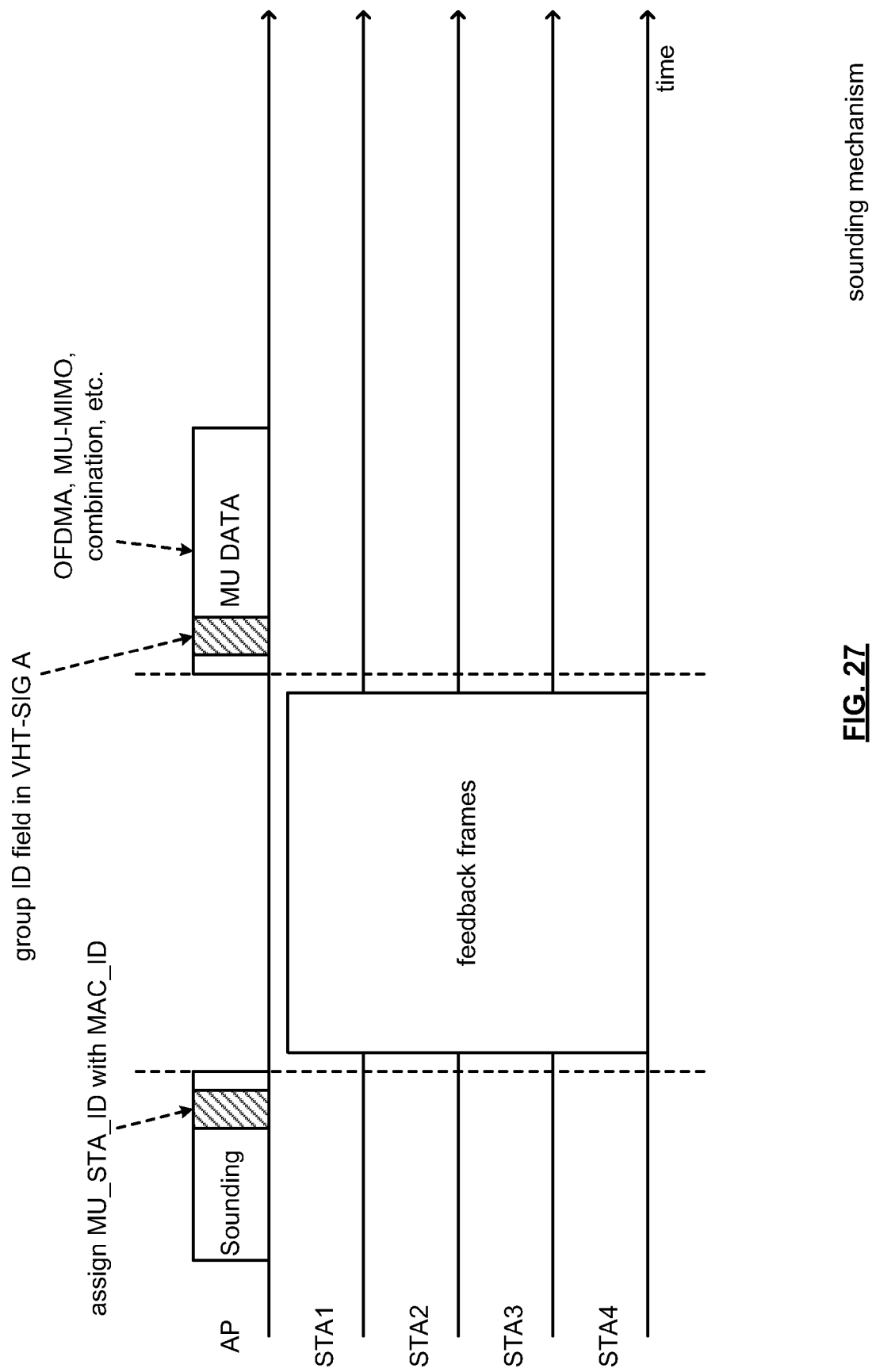
FIG. 27 is a diagram illustrating an embodiment of a timing diagram corresponding to a sounding mechanism.

FIG. 27 is a diagram illustrating an embodiment of a timing diagram corresponding to a sounding mechanism. Within the MU data packet, the group ID therein identifies the location of the space-time streams (STSs) for the respective MU_STA_IDs. From this defined order, each destination or recipient STA knows the assigned number (e.g., 1 to 4 in the exemplary embodiments presented herein). As described elsewhere herein, the sounding/management frame assigns the MU_STA_ID (possible candidates for MU-MIMO packet recipients) with MAC_ID. For example, in one embodiment, STA_A=AID1, STA_B=AID8, STA_C=AID20, and so on. The associated additional overhead for such an implementation would be 8×11 bits=11 bytes. If it may be desired for a transmitting wireless communication device (e.g., AP) to reduce the number of participants for the group (e.g., being less than 8), it may then fill zeros for those respective MAC_ID for certain MU_STA_IDs; in such an embodiment, a single group ID LUT should be able to cover all of the possible combinations.

As also mentioned herein, the group ID in VHT-SIG A field indicates the location of the STSs for the participating STAs. Due to an embodiment including multiple subsets of wireless communication devices per group ID (e.g., a group ID corresponding to more than one subset of wireless communication devices), those wireless communication devices being non-recipients in the same group ID may also try to decode the packet. However, those non-recipient wireless communication devices can drop the packet either at the VHT-SIG B field, the MAC header field, the CRC field, or some other desired field within the packet. If a MU-MIMO packet is for 2 users only for example, corresponding Nsts_k in the GrpID field=0.

Figure 28:
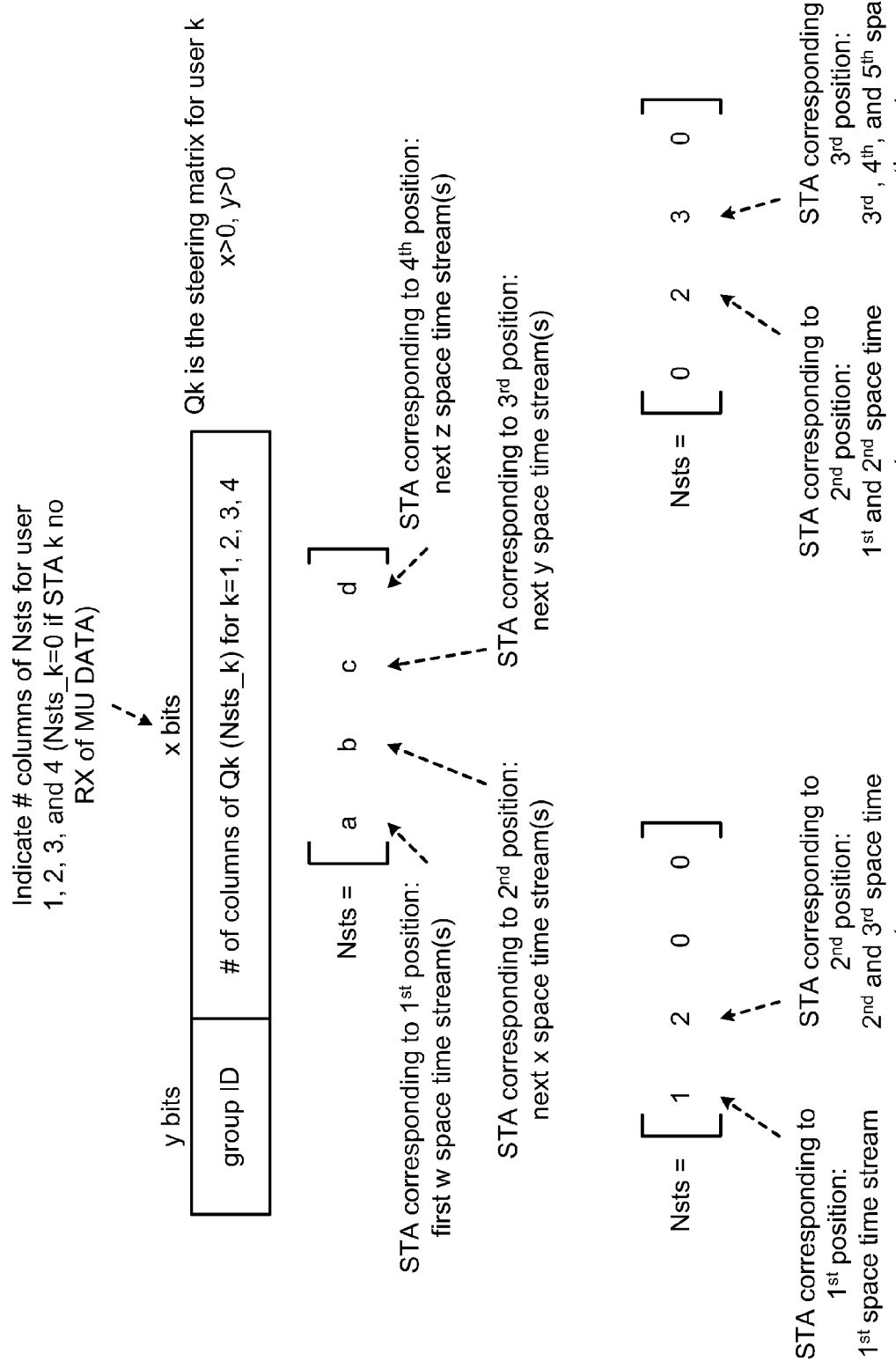
FIG. 28 is a diagram illustrating an embodiment of location indication for multi-user (MU) streams in a VHT-SIG A field of a packet.

FIG. 28 is a diagram illustrating an embodiment of location indication for multi-user (MU) streams in a VHT-SIG A field of a packet. This diagram further describes an embodiment of respective STS location indication for the MU streams in the VHT-SIG A field. The VHT-SIG A field tells the number of columns of Qk (e.g., the steering matrix for user k) in the order of assigned user number in the group-definition-field. All the receiving wireless communication devices (e.g., STAs) can listen to the VHT-SIG A field, so each participating user or wireless communication device knows when to start detecting its own respective STS. The VHT-SIG A field may include following field (called Group ID field). Some of these bits as shown in this embodiment may be reused for a SU-MIMO packet as well without departing from the scope and spirit of the invention.

The number of bits, x, indicates the number of columns of the Nsts field for the respective user or wireless communication device as 1, 2, 3 and 4. It is noted that it is possible the number of space-time streams, Nsts_k=0, for certain k if STA k is not a recipient of MU-MIMO packet. For example, when inspecting the Nsts field, those locations would simply be zero.

As can be seen in the example Nsts field of the lower left hand portion of the diagram, when a given wireless communication device corresponds to a first position within the subset, then the $1^{st}$ space-time stream corresponds to that STA; when a given wireless communication device corresponds to a second position within the subset, then the next 2 space-time streams (i.e., the $2^{nd}$ and $3^{rd}$ space-time streams) corresponds to that STA. Alternatively, if a given wireless communication device corresponds to a third or fourth position within the subset, then the no space-time streams correspond to that wireless communication device.

As can be seen in the other example Nsts field of the lower right hand portion of the diagram, when a given wireless communication device corresponds to a first or fourth position within the subset, then no space-time streams correspond to that wireless communication device. When a given wireless communication device corresponds to a second position within the subset, then the first two space-time streams (i.e., the $1^{st}$ and $2^{nd}$ space-time streams) corresponds to that STA. Alternatively, if a given wireless communication device corresponds to a third position within the subset, then the next three space-time streams (i.e., the $3^{rd}$, $4^{th}$, and $5^{th}$ space-time streams) corresponds to that STA.

As may be understood, the use of employing a group ID can provide numerous benefits. For example, it allows a lot of flexibility to control a given group of MU-MIMO recipients. With the use of a group ID LUT in accordance with the principles presented herein, coverage of both group combinations and the power saving (such as in accordance with early detection of destination for the packet) can be achieved. Considering an example of 100 STAs in a basic services set (BSS) and for 8 STAs for MU_STA_ID, then the other 92 STAs can go to sleep early by detecting a non-zero group ID in a MU data packet (e.g., OFDMA, MU-MIMO, etc.) Also, with the use of group ID, it may be easier to control the channel state information (CSI) feedback frame associated with sounding. Selection of which STAs to be sounded may be more easily performed when using group ID.

Figure 29:
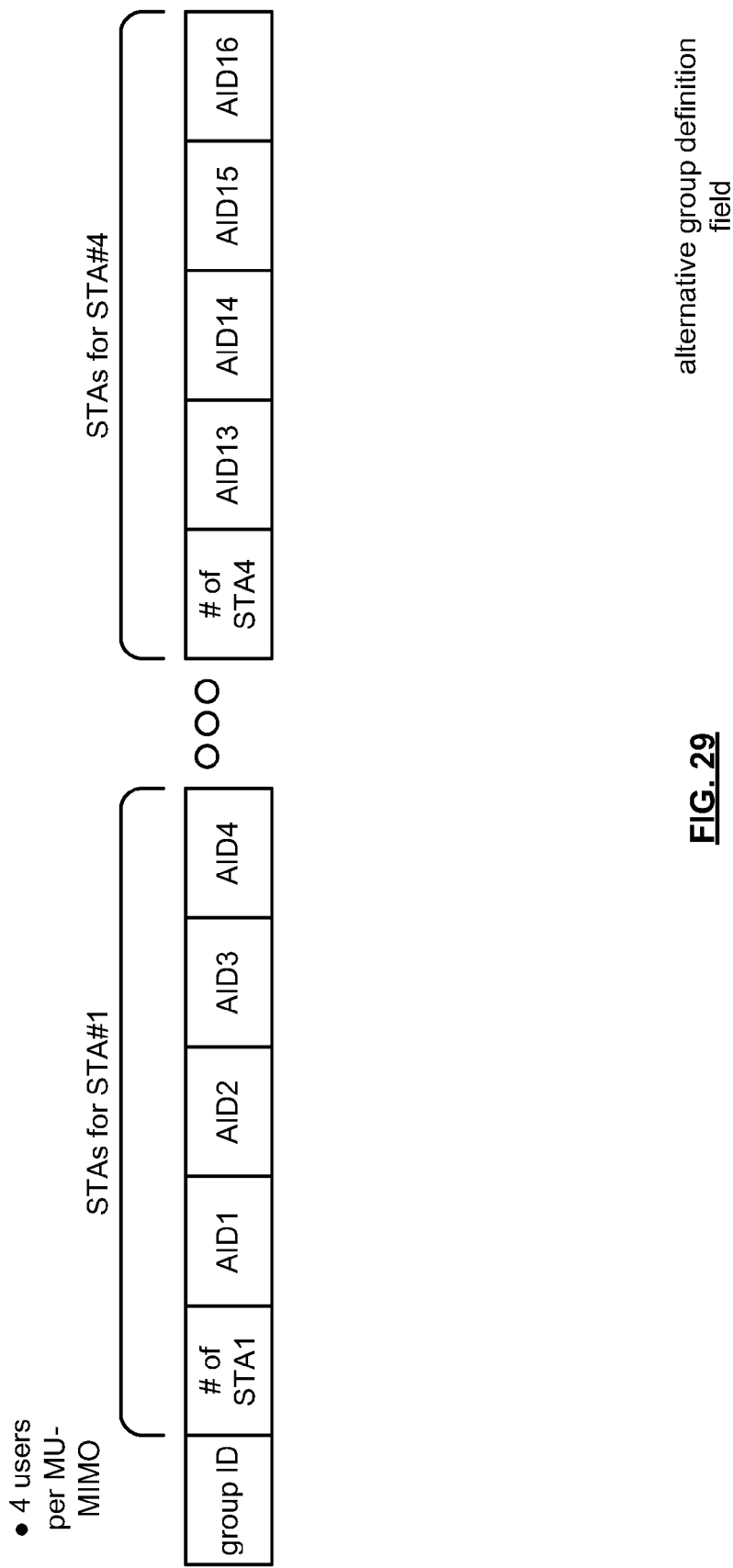
FIG. 29 is a diagram illustrating an embodiment of an alternative group definition field.

FIG. 29 is a diagram illustrating an embodiment of an alternative group definition field. This embodiment again operates using the exemplary situation of 4 users per MU-MIMO. A Group-definition-field may be defined as described elsewhere herein with the same rule as follows: within the same GroupID, a STA cannot be assigned multiple times for different STA number. The number assigned for each STAk can be different per k. For example, if a group contains only one set of wireless communication devices (e.g., STA 1, 2, 3, 4), then all of "# of STAk" can be set as ones.

It is also noted that the various operations and functions as described with respect to various methods herein may be performed within a wireless communication device, such as using a baseband processing module implemented therein, (e.g., such as in accordance with the baseband processing module as described with reference to FIG. 2). For example, such a baseband processing module can performing generation of various group definition fields, group IDs, group ID LUTs, setting values of various respective fields within various packets that may be communicated between wireless communication devices etc. and/or any other operations and functions as described herein, etc. or their respective equivalents.

FIG. 30 and FIG. 31 illustrate embodiments of methods for operating wireless communication devices.

The method 3000 of the FIG. 30 may be viewed generally as being performed within a transmitting wireless communication device such as within an access point (AP), or a wireless station (STA) operating functionally similar to or equivalent as an AP, within a communication system including a number of wireless communication devices (e.g., number of STAs and/or APs).

Referring to method 3000 of FIG. 30, the method 3000 begins by transmitting a group definition field (and/or a LUT) to a plurality of wireless communication devices, as shown in a block 3010. The method 3000 continues by transmitting a multi-user packet, that includes a group ID, to the plurality of wireless communication devices, as shown in a block 3020.

In certain embodiments, based on the group definition field (and/or a LUT), the group ID (of multi-user packet) indicates a plurality of subsets of wireless communication devices (e.g., subset 1, subset 2, etc.), as shown in a block 3020a. Alternatively or in addition, the group ID (of multi-user packet) indicating respective field(s) of multi-user packet corresponds to wireless communication devices (e.g., first field for first wireless communication device, second field for second wireless communication device, etc.), as shown in a block 3020b.

Also, in some instances, the group ID (of multi-user packet) indicates first space time stream corresponding to first wireless communication device, second space time stream corresponding to first wireless communication device, etc., as shown in a block 3020c.

The methods 3100 of the FIG. 31 may be viewed generally as being performed within receiving wireless communication device such as within a STA within a communication system including a number of wireless communication devices (e.g., number of STAs and/or APs).

Referring to method 3100 of FIG. 31, the method 3100 begins by receiving a multi-user packet that includes a group ID, as shown in a block 3110. The method 3100 continues by determining if recipient of multi-user packet based on group ID, as shown in a block 3120. If it is determined that this particular wireless communication device is not a recipient of the multi-user packet, as shown in a decision block 3030, then the method 3100 operates by discarding multi-user packet, as shown in a block 3130.

Alternatively, based on a GroupID and a previously received group definition field and/or LUT, if it is determined that this particular wireless communication device is in fact a recipient of the multi-user packet, as shown in a decision block 3030, then the method 3100 operates by processing a portion of the multi-user packet corresponding to recipient, as shown in a block 3150. In certain embodiments, the operations of the block 3150 may involve identifying and processing those space time streams (e.g., Nsts field) of multi-user packet corresponding to recipient, as shown in a block 3140.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |

TABLE 1-continued 2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask | 1 |
|---|---|
| Frequency Offset | dBr |
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |

TABLE 6-continued 2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask | 2 |
|---|---|
| Frequency Offset | dBr |
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for execution by a wireless communication device, the method comprising:
    transmitting a group definition field to a plurality of wireless communication devices via a first transmission; and
    transmitting a multi-user packet to the plurality of wireless communication devices via a second transmission that is different than the first transmission, wherein:
    the multi-user packet including a group identification field (group ID) indicating, based on the group definition field, a first field of the multi-user packet to be processed by a first of the plurality of wireless communication devices and a second field of the multi-user packet to be processed by a second of the plurality of wireless communication devices;
    the group ID corresponding to a plurality of subsets of the plurality of wireless communication devices; and
    based on the group ID, at least one additional field within the multi-user packet indicating a first at least one space-time stream within the multi-user packet corresponding to the first of the plurality of wireless communication devices and a second at least one space-time stream within the multi-user packet corresponding to the second of the plurality of wireless communication devices.

2. The method of claim 1, wherein:
    the plurality of wireless communication devices including a first wireless communication device and a second wireless communication device;
    each of the plurality of subsets of the plurality of wireless communication devices including a common number of wireless communication devices;
    each of a first group of the plurality of subsets of the plurality of wireless communication devices including the first wireless communication device having the first wireless communication device in a first common location therein; and
    each of a second group of the plurality of subsets of the plurality of wireless communication devices including the second wireless communication device having the second wireless communication device in a second common location therein.

3. The method of claim 1, wherein:
    each of the plurality of subsets of the plurality of wireless communication devices including a common number of wireless communication devices;
    a first of the plurality of subsets of the plurality of wireless communication devices including a first wireless communication device and a second wireless communication device;
    a second of the plurality of subsets of the plurality of wireless communication devices including the first wireless communication device and a third wireless communication device; and
    the first wireless communication device being in a common location in each of the first of the plurality of subsets of the plurality of wireless communication devices and the second of the plurality of subsets of the plurality of wireless communication devices.

4. The method of claim 1, wherein the group ID indicating, based on the group definition field, a first field of the multi-user packet to be processed by each wireless communication device within a first of plurality of subsets of the plurality of wireless communication devices and a second field of the multi-user packet to be processed by a second of the plurality of wireless communication devices.

5. The method of claim 1, wherein:
    the group definition field corresponding to a look up table (LUT); and further comprising:
    identifying the plurality of subsets of the plurality of wireless communication devices to which the group ID corresponds by processing the LUT indicating correspondence between each of the plurality of subsets of the plurality of wireless communication devices and respective group IDs.

6. The method of claim 5 further comprising:
    transmitting at least one of the LUT and at least one additional LUT to the plurality of wireless communication devices.

7. The method of claim 5 further comprising:
    receiving at least one of the LUT and at least one additional LUT from at least one of the plurality of wireless communication devices.

8. The method of claim 5 further comprising:
    during a first time, identifying the plurality of subsets of the plurality of wireless communication devices to which the group ID corresponds by processing a first LUT indicating a first correspondence between various subsets of the plurality of wireless communication devices and respective group IDs;
    during a second time, identifying at least one additional plurality of subsets of the plurality of wireless communication devices to which the group ID corresponds by processing a second LUT indicating a second correspondence between various subsets of the plurality of wireless communication devices and respective group IDs.

9. The method of claim 1, wherein:
    the wireless communication device includes an access point (AP); and
    the plurality of wireless communication devices includes a plurality of wireless stations (STAs).

10. A method for execution by a wireless communication device, the method comprising:
    transmitting a look up table (LUT) to a plurality of wireless communication devices via a first transmission; and
    transmitting a multi-user packet to the plurality of wireless communication devices via a second transmission that is different than the first transmission, wherein:
    the multi-user packet including a group identification field (group ID) indicating, based on the LUT, a first field of the multi-user packet to be processed by a first of the plurality of wireless communication devices and a second field of the multi-user packet to be processed by a second of the plurality of wireless communication devices;
    the group ID corresponding to a plurality of subsets of the plurality of wireless communication devices in accordance with the LUT indicating correspondence between each of the plurality of subsets of the plurality of wireless communication devices and respective group IDs;

based on the group ID, at least one additional field within the multi-user packet indicating a first at least one space-time stream within the multi-user packet corresponding to the first of the plurality of wireless communication devices and a second at least one space-time stream within the multi-user packet corresponding to the second of the plurality of wireless communication devices; and each of the plurality of subsets of the plurality of wireless communication devices including a common number of wireless communication devices.

11. The method of claim 10, wherein:

the plurality of wireless communication devices including a first wireless communication device and a second wireless communication device;

each of a first group of the plurality of subsets of the plurality of wireless communication devices including the first wireless communication device having the first wireless communication device in a first common location therein; and each of a second group of the plurality of subsets of the plurality of wireless communication devices including the second wireless communication device having the second wireless communication device in a second common location therein.

12. The method of claim 10, wherein:

the group ID indicating, based on the LUT, a first field of the multi-user packet to be processed by each wireless communication device within a first of plurality of subsets of the plurality of wireless communication devices and a second field of the multi-user packet to be processed by a second of the plurality of wireless communication devices.

13. The method of claim 10 further comprising:

identifying the plurality of subsets of the plurality of wireless communication devices to which the group ID corresponds by processing the LUT indicating correspondence between each of the plurality of subsets of the plurality of wireless communication devices and respective group IDs.

14. The method of claim 10, wherein:

the wireless communication device includes an access point (AP); and the plurality of wireless communication devices includes a plurality of wireless stations (STAs).

15. An apparatus comprising:

a processor configured to generate a group definition field and a multi-user packet; and communication interface configured to:
    transmit the group definition field to a plurality of wireless communication devices via a first transmission; and
    transmit the multi-user packet to the plurality of wireless communication devices via a second transmission that is different than the first transmission; and wherein:

the multi-user packet including a group identification field (group ID) indicating, based on the group definition field, a first field of the multi-user packet to be processed by a first of the plurality of wireless communication devices and a second field of the multi-user packet to be processed by a second of the plurality of wireless communication devices;

the group ID corresponding to a plurality of subsets of the plurality of wireless communication devices; and based on the group ID, at least one additional field within the multi-user packet indicating a first at least one space-time stream within the multi-user packet corresponding to the first of the plurality of wireless communication devices and a second at least one space-time stream within the multi-user packet corresponding to the second of the plurality of wireless communication devices.

16. The apparatus of claim 15, wherein:

the plurality of wireless communication devices including a first wireless communication device and a second wireless communication device;

each of the plurality of subsets of the plurality of wireless communication devices including a common number of wireless communication devices;

each of a first group of the plurality of subsets of the plurality of wireless communication devices including the first wireless communication device having the first wireless communication device in a first common location therein; and each of a second group of the plurality of subsets of the plurality of wireless communication devices including the second wireless communication device having the second wireless communication device in a second common location therein.

17. The apparatus of claim 15, wherein:

each of the plurality of subsets of the plurality of wireless communication devices including a common number of wireless communication devices;

a first of the plurality of subsets of the plurality of wireless communication devices including a first wireless communication device and a second wireless communication device;

a second of the plurality of subsets of the plurality of wireless communication devices including the first wireless communication device and a third wireless communication device; and the first wireless communication device being in a common location in each of the first of the plurality of subsets of the plurality of wireless communication devices and the second of the plurality of subsets of the plurality of wireless communication devices.

18. The apparatus of claim 15, wherein the group ID indicating, based on the group definition field, a first field of the multi-user packet to be processed by each wireless communication device within a first of plurality of subsets of the plurality of wireless communication devices and a second field of the multi-user packet to be processed by a second of the plurality of wireless communication devices.

19. The apparatus of claim 15, wherein the group definition field corresponding to a look up table (LUT); and further comprising:

the processor configured to identify the plurality of subsets of the plurality of wireless communication devices to which the group ID corresponds by processing the LUT indicating correspondence between each of the plurality of subsets of the plurality of wireless communication devices and respective group IDs.

20. The apparatus of claim 19 further comprising:

the apparatus configured to transmit at least one of the LUT and at least one additional LUT to the plurality of wireless communication devices.

21. The apparatus of claim 19 further comprising:

the apparatus configured to receive at least one of the LUT and at least one additional LUT from at least one of the plurality of wireless communication devices.

22. The apparatus of claim 19 further comprising:
during a first time, the processor configured to identify the plurality of subsets of the plurality of wireless communication devices to which the group ID corresponds by processing a first LUT indicating a first correspondence between various subsets of the plurality of wireless communication devices and respective group IDs;
during a second time, the processor configured to identify at least one additional plurality of subsets of the plurality of wireless communication devices to which the group ID corresponds by processing a second LUT indicating a second correspondence between various subsets of the plurality of wireless communication devices and respective group IDs.

23. The apparatus of claim 15, wherein: 15 further comprising:
an access point (AP), and wherein the plurality of wireless communication devices includes a plurality of wireless stations (STAs).

* * * * *